United States Patent
Chang et al.

(10) Patent No.: US 11,350,083 B2
(45) Date of Patent: May 31, 2022

(54) INTRA BLOCK COPY MERGING DATA SYNTAX FOR VIDEO CODING

(71) Applicant: QUALCOMM Incorporated, San Diego, CA (US)

(72) Inventors: Yao-Jen Chang, San Diego, CA (US); Chun-Chi Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/847,918

(22) Filed: Apr. 14, 2020

(65) Prior Publication Data
US 2020/0336735 A1    Oct. 22, 2020

Related U.S. Application Data

(60) Provisional application No. 62/836,208, filed on Apr. 19, 2019.

(51) Int. Cl.
*H04N 19/105* (2014.01)
*H04N 19/159* (2014.01)
*H04N 19/176* (2014.01)
*H04N 19/46* (2014.01)
*H04N 19/70* (2014.01)

(52) U.S. Cl.
CPC ......... *H04N 19/105* (2014.11); *H04N 19/159* (2014.11); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 10,462,483 B1* | 10/2019 | Xu | ........................ | H04N 19/176 |
| 2017/0280159 A1* | 9/2017 | Xu | ........................ | H04N 19/52 |
| 2019/0335200 A1* | 10/2019 | Xu | ........................ | H04N 19/176 |
| 2019/0379909 A1* | 12/2019 | Xu | ........................ | H04N 19/523 |
| 2020/0359040 A1 | 11/2020 | Xu et al. | | |
| 2021/0014528 A1 | 1/2021 | Xu et al. | | |

(Continued)

FOREIGN PATENT DOCUMENTS

WO    2016034058 A1    3/2016

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.

(Continued)

*Primary Examiner* — Talha M Nawaz
(74) *Attorney, Agent, or Firm* — Shumaker & Sieffert, P.A.

(57) ABSTRACT

A method of encoding and decoding video data, including coding a first syntax element that specifies a value used to derive a maximum number of intra block copy merging candidates, deriving the maximum number of intra block copy merging candidates based on the value of the first sytnax element, and coding a first block of video data using intra block copy mode according to the maximum number of intra block copy merging candidates.

28 Claims, 14 Drawing Sheets

L0 Reference

L1 Reference

MMVD SEARCH POINT

(56) References Cited

U.S. PATENT DOCUMENTS

2021/0044816 A1* 2/2021 Xu .................. H04N 19/105
2021/0218987 A1 7/2021 Li et al.
2021/0227206 A1 7/2021 Chiu et al.

OTHER PUBLICATIONS

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001_v10, pp. 1-408.
Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Chang Y., et al, "Non-CE8: On IBC Merge Mode", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0455-v2, pp. 1-4.
Xu X., et al, "Non-CE8: On IBC Merge List Size Signaling", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0457-v2, pp. 1-4.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "Versatile Video Coding (Draft 5)", Joint Video Experts Team (JVET) of ITU-T SG 16 WP 3 and ISO/IEC JTC 1/SC 29/WG 11, JVET-N1001-V2, 14th Meeting: Geneva, CH, Mar. 19-27, 2019, 364 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.
ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
International Search Report and Written Opinion—PCT/US2020/028266—ISA/EPO—Jul. 14, 2020.
Nam et al., "CE8-related: Signaling on maximum number of candidates for IBC merge mode," Joint Video Experts Team (JVET) of ITU-T SG 16 WP 3 and ISO/IEC JTC 1/SC 29/WG 11, 14th meeting, Geneva, JVET-N0461, Mar. 2019, 4 pp.
Bross et al., "Versatile Video Coding (Draft 4)," Joint Video Experts Team (JVET) of ITU-T SG 16 WP 3 and ISO/IEC JTC 1/SC 29/WG 11, 13th meeting, Marrakech JVET-M1001, Jan. 2019, 296 pp.
Chang et al., "Non-CE4: On MMVD Signaling," Joint Video Experts Team (JVET) of ITU-T SG 16 WP 3 and ISO/IEC JTC 1/SC 29/WG 11, 14th meeting, Geneva, JVET-N0448, Mar. 2019, 12 pp.
Xu et al., "BoG report on CE8-related contributions and updates for screen content CTC," Joint Video Experts Team (JVET) of ITU-T SG 16 WP 3 and ISO/IEC JTC 1/SC 29/WG 11, 14th meeting, Geneva, JVET-N0780, Mar. 2019, 29 pp.
Li et al., "CE4-related: Signalling of maximum number of triangle candidates," Joint Video Experts Team (JVET) of ITU-T SG 16 WP 3 and ISO/IEC JTC 1/SC 29/WG 11, 14th meeting, Geneva, JVET-N0400, Mar. 2019, 5 pp.
Chang et al., "Non-CE8: On IBC merge mode," Joint Video Experts Team (JVET) of ITU-T SG 16 WP 3 and ISO/IEC JTC 1/SC 29/WG 11, 14th meeting, Geneva, JVET-N0455, Mar. 2019, 6 pp.
Nam J., et al., "CE8-Related: Signaling on Maximum Number of Candidates for IBC Merge Mode," JVET-N0461-v2, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-4.

* cited by examiner

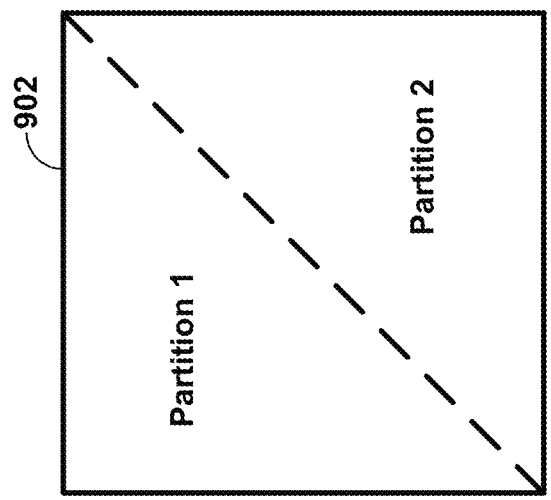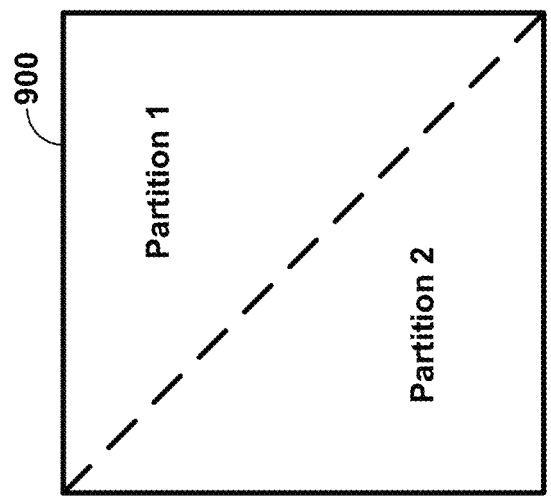
FIG. 9

INTRA BLOCK COPY MERGING DATA SYNTAX FOR VIDEO CODING

This application claims the benefit of U.S. Provisional Application No. 62/836,208, filed Apr. 19, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding. More specifically, this disclosure describes video coding techniques that may improve the signaling of syntax and/or improve the coding efficiency of intra block copy (IBC) merge mode. The techniques of this disclosure may be used with the Versatile Video Coding standard currently under development and other future video coding standards.

Intra block copy merge mode is a mode of motion vector (or block vector) prediction for intra block copy mode. In intra block copy mode, a current block of video data is predicted from another block of video data, identified by a motion vector, that is in the same picture as the current block of video. This differs from regular merge inter prediction where a motion vector is predicted for use in regular, translation inter prediction. In regular, translation inter prediction, a current block of video data is predicted from another predictive block of video data in a different picture, where the predictive block of video data is identified by a motion vector, a reference picture list, and a reference picture index.

In some examples of the disclosure, a video coder (e.g., video encoder and video decoder) may be configured to code (i.e., encode or decode) a syntax element that indicates, either directly or indirectly, the maximum number of intra block copy merging candidates that are to be used to determine motion/block vectors that is used code a portion of video data (e.g., a block, slice, picture, etc.). This syntax element is separate from any syntax elements that may indicate a maximum number of merging candidates for other prediction modes (e.g., regular merge inter prediction). By using a separate syntax element for the maximum number of intra block copy merging candidates for intra block copy mode, the techniques of this disclosure may provide for more flexibility and/or coding efficiency when coding video data using intra block copy mode.

For example, coding video data using intra block copy mode may be performed with higher coding efficiency using fewer merging candidates than regular merge mode for natural content (e.g., a scene captured by a camera). Conversely, coding video data using intra block copy mode may be performed with higher coding efficiency using more merging candidates than regular merge mode for screen content (e.g., a scene generated by a computer). Having a separate syntax element that indicates the maximum number of intra block copy merging candidates for intra block copy mode may provide for flexibility and may increase coding efficiency for video codecs that deal with multiple different types of content (e.g., natural vs. screen content).

In one example, this disclosure describes a method of decoding video data, the method comprising decoding a first syntax element that specifies a value used to derive a maximum number of intra block copy merging candidates, deriving the maximum number of intra block copy merging candidates based on the value of the first sytnax element, and decoding a first block of video data using intra block copy mode according to the maximum number of intra block copy merging candidates.

In another example, this disclosure describes an apparatus configured to decode video data, the apparatus comprising a memory configured to store a first block of video data, and one or more processors, implemented in circuitry and in communication with the memory, the one or more processors configured to decode a first syntax element that specifies a value used to derive a maximum number of intra block copy merging candidates, derive the maximum number of intra block copy merging candidates based on the value of the first sytnax element, and decode the first block of video data using intra block copy mode according to the maximum number of intra block copy merging candidates.

In another example, this disclosure describes an apparatus configured to decode video data, the apparatus comprising means for decoding a first syntax element that specifies a value used to derive a maximum number of intra block copy merging candidates, means for deriving the maximum number of intra block copy merging candidates based on the value of the first sytnax element, and means for decoding a first block of video data using intra block copy mode according to the maximum number of intra block copy merging candidates.

In another example, this disclosure describes a non-transitory computer-readable storage medium storing instructions that, when executed, cause one or more processors of a device configured to decode video data to decode a first syntax element that specifies a value used to derive a maximum number of intra block copy merging candidates, derive the maximum number of intra block copy merging candidates based on the value of the first sytnax element, and decode a first block of video data using intra block copy mode according to the maximum number of intra block copy merging candidates.

In another example, this disclosure describes an apparatus configured to encode video data, the apparatus comprising a memory configured to store a first block of video data, and one or more processors, implemented in circuitry and in communication with the memory, the one or more processors configured to determine a maximum number of intra block copy merging candidates for a first block of video data, encode a first syntax element that specifies a value used to derive the maximum number of intra block copy merging candidates, and encode the first block of video data using intra block copy mode according to the maximum number of intra block copy merging candidates.

The details of one or more examples are set forth in the accompanying drawings and the description below. Other features, objects, and advantages will be apparent from the description, drawings, and claims.

BRIEF DESCRIPTION OF DRAWINGS

FIG. 9 is a conceptual diagram illustrating triangle partition based inter prediction.

DETAILED DESCRIPTION

Figure 1:
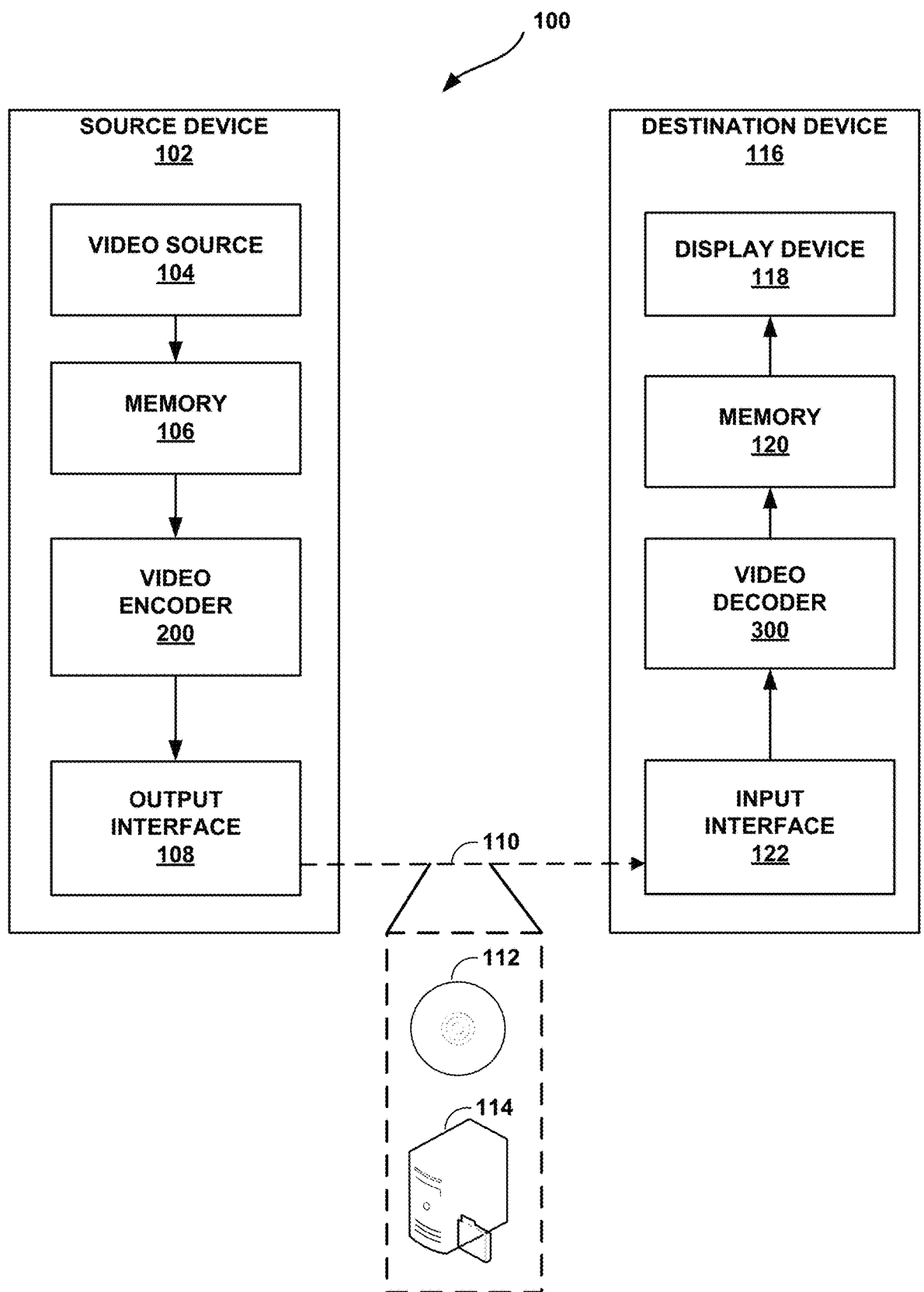
FIG. 1 is a block diagram illustrating an example video encoding and decoding system that may perform the techniques of this disclosure.

In general, this disclosure describes techniques for video coding. More specifically, this disclosure describes video coding techniques that may improve the signaling of syntax and/or improve the coding efficiency of intra block copy (IBC) merge mode. The techniques of this disclosure may be used with the Versatile Video Coding standard currently under development and other future video coding standards.

Intra block copy merge mode is a mode of motion vector (or block vector) prediction for intra block copy mode. In intra block copy mode, a current block of video data is predicted from another block of video data, identified by a motion vector, that is in the same picture as the current block of video. This differs from regular merge inter prediction where a motion vector is predicted for use in regular, translation inter prediction. In regular, translation inter prediction, a current block of video data is predicted from another predictive block of video data in a different picture, where the predictive block of video data is identified by a motion vector, a reference picture list, and a reference picture index.

In some examples of the disclosure, a video coder (e.g., video encoder and video decoder) may be configured to code (i.e., encode or decode) a syntax element that indicates, either directly or indirectly, the maximum number of intra block copy merging candidates that are to be used to determine motion vectors used code a portion of video data (e.g., a block, slice, picture, etc.). This syntax element is separate from any syntax elements that may indicate a maximum number of merging candidates for other prediction modes (e.g., regular merge inter prediction). By using a separate syntax element for the maximum number of intra block copy merging candidates for intra block copy mode, the techniques of this disclosure may provide for more flexibility and/or coding efficiency when coding video data using intra block copy mode.

For example, coding video data using intra block copy mode may be performed with higher coding efficiency using fewer merging candidates than regular merge mode for natural content. Conversely, coding video data using intra block copy mode may be performed with higher coding efficiency using more merging candidates than regular merge mode for screen content. Having a separate syntax element that indicates the maximum number of intra block copy merging candidates for intra block copy mode may provide for flexibility and may increase coding efficiency for video codecs that deal with multiple different types of content (e.g., natural vs. screen content).

As will be explained in more detail below, in accordance with one example of the disclosure, a video encoder and/or video decoder may be configured to code a first syntax element that specifies a value used to derive a maximum number of intra block copy merging candidates, derive the maximum number of intra block copy merging candidates based on the value of the first sytnax element, and code the first block of video data using intra block copy mode according to the maximum number of intra block copy merging candidates.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data using intra block copy mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding video data using intra block copy mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v2 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video decoder 300 may be configured to decode a first syntax element that specifies a value used to derive a maximum number of intra block copy merging candidates, derive the maximum number of intra block copy merging candidates based on the value of the first sytnax element, and decode the first block of video data using intra block copy mode according to the maximum number of intra block copy merging candidates. Likewise, in a reciprocal fashion, video encoder 200 may be configured to determine a maximum number of intra block copy merging candidates for a first block of video data, encode a first syntax element that specifies a value used to derive the maximum number of intra block copy merging candidates, and encode the first block of video data using intra block copy mode according to the maximum number of intra block copy merging candidates.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
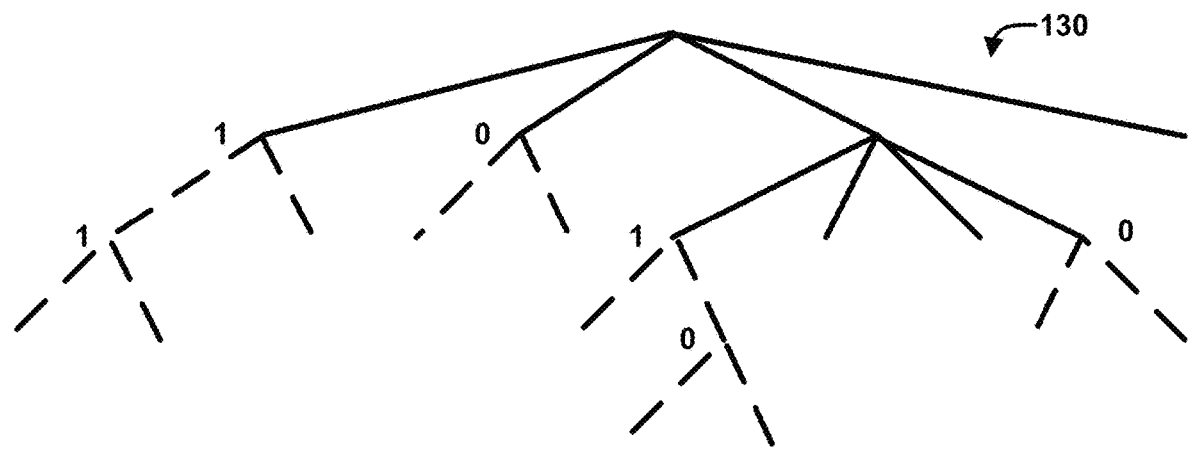
FIGS. 2A and 2B are conceptual diagrams illustrating an example quadtree binary tree (QTBT) structure, and a corresponding coding tree unit (CTU).
Figure 2B:
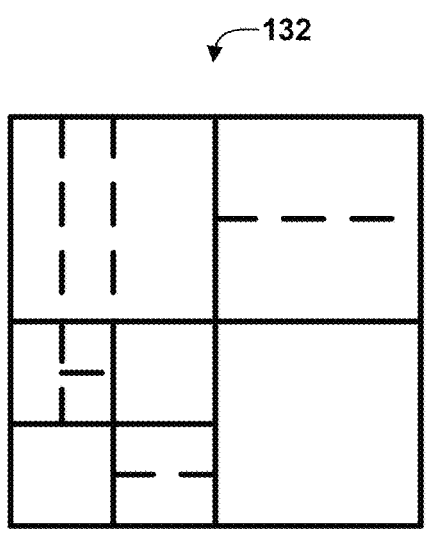

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
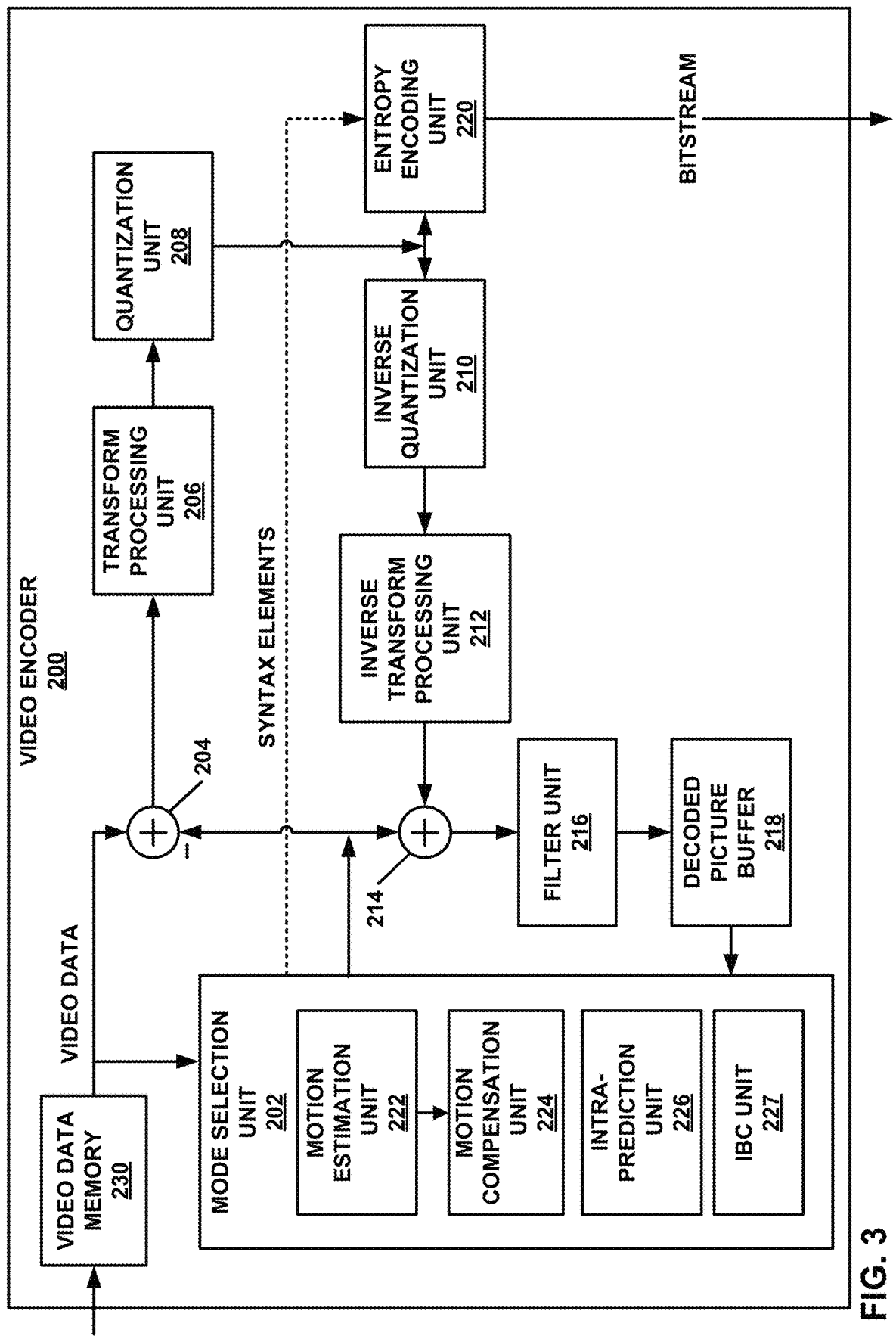
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of JEM, VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, an intra-prediction unit 226, and an intra block copy (IBC) unit 227. In some examples, IBC unit 227 may be part of motion estimation unit 222 and/or motion compensation unit 224. Mode selection unit 202 may include additional functional units to perform video prediction in accordance with other prediction modes. As examples, mode selection unit 202 may include a palette unit, an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, intra-prediction unit 226, and IBC unit 227) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 may also determine to encode blocks of video data using an intra block copy (IBC) mode using IBC unit 227. In general, in IBC mode, video encoder 200 may determine predictive blocks for a current block, where the predictive blocks are in the same frame (picture) as the current block. The predictive blocks may be identified by a motion vector (also called a block vector). In some examples, the locations of predictive blocks available for IBC mode are limited to the locations of blocks that have already been encoded. IBC unit 227 may be configured to encode video data using the techniques that are described in more detail below. For example, IBC unit 227 may be configured to determine a maximum number of intra block copy merging candidates for a first block of video data, encode a first syntax element that specifies a value used to derive the maximum number of intra block copy merging candidates, and encode the first block of video data using intra block copy mode according to the maximum number of intra block copy merging candidates.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 and/or IBC unit 227 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to determine a maximum number of intra block copy merging candidates for a first block of video data, encode a first syntax element that specifies a value used to derive the maximum number of intra block copy merging candidates, and encode the first block of video data using intra block copy mode according to the maximum number of intra block copy merging candidates.

Figure 4:
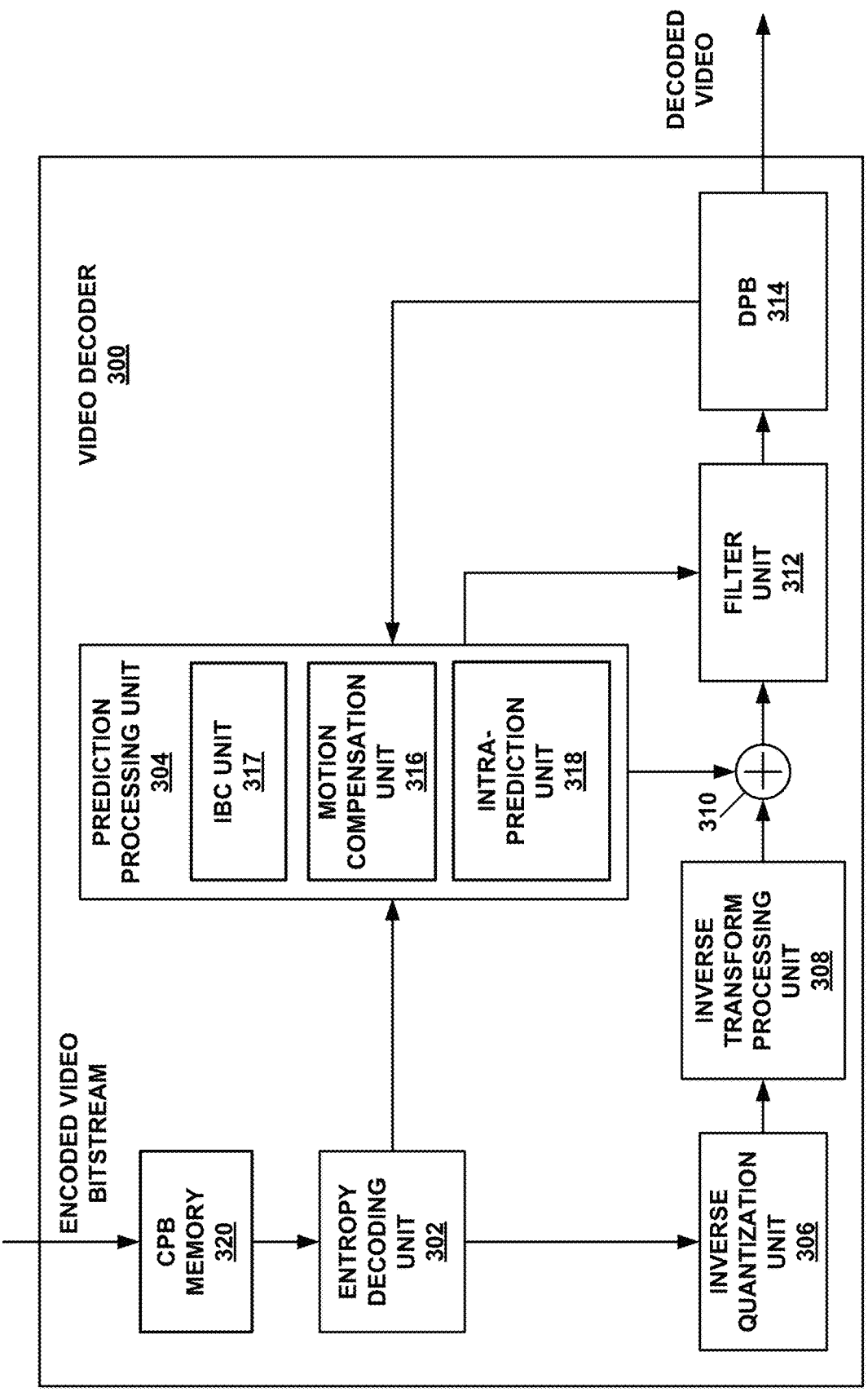
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316, intra-prediction unit 318, and intra block copy (IBC) unit 317. In some examples, the intra block copy unit may be part of motion compensation unit 316. Prediction processing unit 304 may include additional units to perform prediction in accordance with other prediction modes. As examples, prediction processing unit 304 may include a palette unit, an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Prediction processing unit 304 may also determine to decode blocks of video data using an intra block copy (IBC) mode using IBC unit 317. In general, in IBC mode, video decoder 300 may determine predictive blocks for a current block, where the predictive blocks are in the same frame as the current block. The predictive blocks may be identified by a block vector. In some examples, the locations of predictive blocks available for IBC mode are limited to the locations of blocks that have already been decoded. IBC unit 317 may be configured to decode video data using the techniques that are described in more detail below. For example, IBC unit 317 may be configured to decode a first syntax element that specifies a value used to derive a maximum number of intra block copy merging candidates, derive the maximum number of intra block copy merging candidates based on the value of the first sytnax element, and decode the first block of video data using intra block copy mode according to the maximum number of intra block copy merging candidates.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured decode a first syntax element that specifies a value used to derive a maximum number of intra block copy merging candidates, derive the maximum number of intra block copy merging candidates based on the value of the first sytnax element, and decode the first block of video data using intra block copy mode according to the maximum number of intra block copy merging candidates.

Video coding techniques related to this disclosure will be described below. Some of the example techniques of this disclosure involve motion vector prediction, including techniques for motion vector prediction using a merge mode. In general, in a merge mode, video encoder 200 and video decoder 300 may construct a merge candidate list of motion vector predictors. The merge candidate list may include one or more merging candidates. For example, a merging candidate may include motion information (e.g., motion vector, reference picture list, reference picture index) from one or more spatial or temporal neighboring blocks of the current block for which the motion vector is being predicted. In other examples, video encoder 200 and video decoder 300 may be configured to generate so-called artificial merging candidates.

In merge mode, video encoder 200 may select the motion information of one of the merging candidates to use for coding the current block. Video encoder 200 may also signal the index of the selected merging candidate (e.g., using a merge index into the merge candidate list) to video decoder 300 if the merge candidate list is greater than 1 merging candidate. Video decoder 300 will construct the merge candidate list using the same process as video encoder 200. Video decoder 300 will select the motion information from a merging candidate in the merge candidate list (e.g., based on the signaled merge index). Video decoder 300 may then decode the current block using the selected motion information. In some examples, as will be described below, video encoder 200 and video decoder 300 may be configured to construct merge candidate lists according to a maximum number of merging candidates Extended Merge Prediction In some examples, video encoder 200 and video decoder 300 may be configured to construct a merge candidate list by including the following five types of merging candidates in order:

1) Spatial motion vector predictors (MVPs) from spatial neighbouring CUs;
2) Temporal MVPs from collocated CUs;
3) History-based MVPs from a First-In, First-Out (FIFO) table;
4) Pairwise average MVPs; and
5) Zero motion vectors (MVs).

In some examples, video encoder 200 may be configured to signal the size of a merge candidate list in slice a header. In some examples, the maximum allowed size of merge candidate list is 6 merging candidates. For each CU in merge mode, video encoder 200 may encode an index of the best merging candidate (e.g., the selected merging candidate) using truncated unary binarization. Video encoder 200 may encode the first bin of the merge index with a context (e.g., CABAC) and may use bypass coding for other bins.

Merge Mode with Motion Vector Difference (MMVD)

In addition to merge mode, where the implicitly derived motion information is directly used for the generation of prediction samples of the current CU, video encoder 200 and video decoder 300 may also be configured to use a merge mode with motion vector differences (MMVD). MMVD was introduced in VVC. Video encoder 200 may signal an MMVD flag after sending a skip flag and/or merge flag to specify whether MMVD mode is used for a CU.

In MMVD, after a merging candidate is selected, video decoder 300 may further refine the merging candidate by the signaled motion vector difference (MVD) information. The further information includes a merge candidate flag, an index to specify motion magnitude, and an index that indicates the motion direction (e.g., the reference picture list). In MMVD mode, one for the first two candidates in the merge list is selected to be used as an MV basis. Video encoder 200 signals a merge candidate flag to specify which one of the first two candidate is used.

Figure 5:
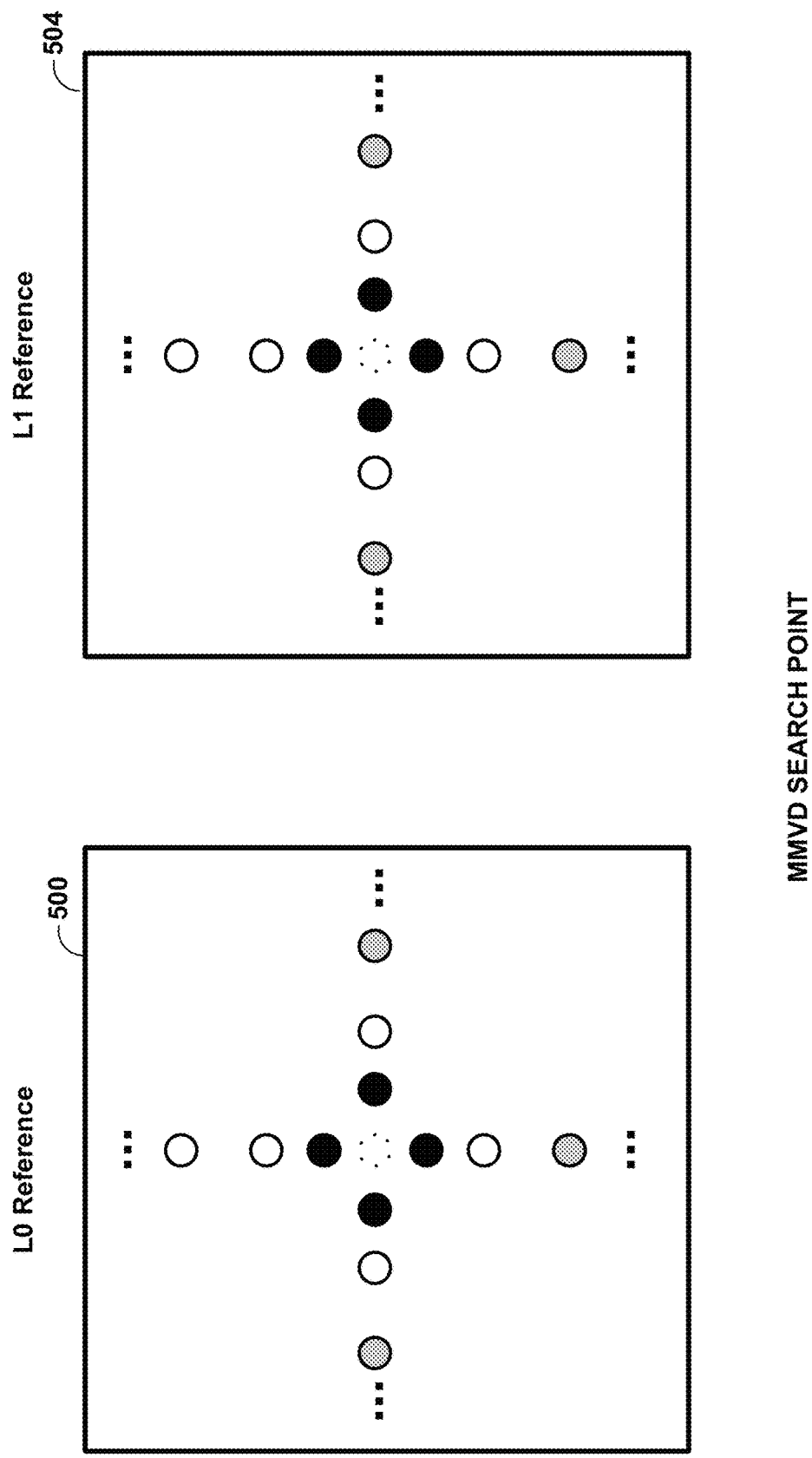
FIG. 5 is a conceptual diagram illustrating an example merge mode with motion vector difference search point.

Video encoder 200 may encode a distance index that specifies motion magnitude information and indicates the pre-defined offset from the starting point. FIG. 5 is a conceptual diagram illustrating an example merge mode with motion vector difference search point. As shown in FIG. 5, an offset is added to either horizontal component or vertical component of a starting MV from a picture 500 in reference picture list L0 or from picture 504 in reference picture list L1. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

The direction index represents the direction of the MVD relative to the starting point. The direction index can represent four directions, as shown in Table 2. It is noted that the meaning of the MVD sign could vary according to the information of the starting MV(s). When the starting MV(s) is a uni-prediction MV or bi-prediction MVs with both lists pointing to the same side of the current picture (i.e., picture order counts (POCs) of two references are both larger than the POC of the current picture, or are both smaller than the POC of the current picture), the sign in Table 2 specifies the sign of the MV offset added to the starting MV. When the starting MVs are bi-prediction MVs with the two MVs pointing to different sides of the current picture (i.e., the POC of one reference is larger than the POC of the current picture, and the POC of the other reference is smaller than the POC of the current picture), the sign in Table 2 specifies the sign of the MV offset added to the list0 MV component of the starting MV. The sign for the list1 MV component has the opposite value.

TABLE 2

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

Affine Merge Prediction

Figure 6:
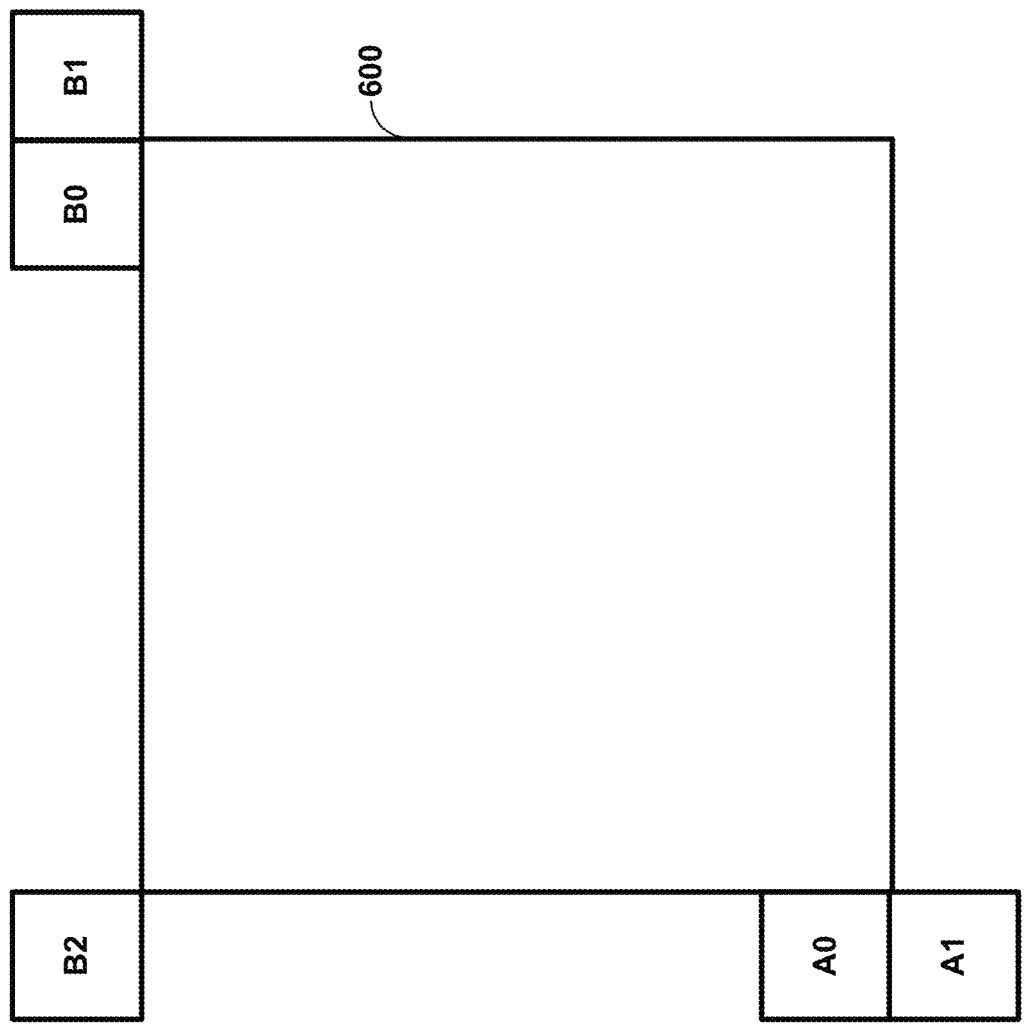
FIG. 6 is a conceptual diagram illustrating locations of inherited affine motion predictors.

In some examples, video encoder 200 and video decoder 300 may be configured to apply affine merge mode (AF_MERGE mode) for CUs with both a width and a height larger than or equal to 8. In affine merge mode, video encoder 200 and video decoder 300 generate the control point motion vectors (CPMVs) of the current CU based on the motion information of the spatial neighboring CUs. There can be up to five control point motion vector predictor (CPMVP) candidates. Video encoder 200 signals an index to indicate the CPMVP to be used for the current CU. The following three types of CPMVP candidate are used to form the affine merge candidate list:

1) Inherited affine merging candidates that are extrapolated from the CPMVs of the neighbour CUs
2) Constructed affine merging candidates CPMVPs that are derived using the translational MVs of the neighbour CUs
3) Zero MVs In some examples, there are a maximum of two inherited affine candidates, which are derived from an affine motion model of the neighboring blocks: one inherited affine candidate from the left neighboring CUs and one inherited affine candidate from the above neighboring CUs. The candidate blocks are shown in FIG. 6. FIG. 6 is a conceptual diagram illustrating locations of inherited affine motion predictors relative to current block 600. For the left predictor, the scan order is A0→A1, and for the above predictor, the scan order is B0→B1→B2. Only the first inherited candidate from each side (i.e., left and above) is selected. No pruning check is performed between the inherited affine candidates. When a neighboring affine CU is identified, video encoder 200 and video decoder 300 use the associated control point motion vectors to derive the CPMVP candidate in the affine merge list of the current CU (e.g., current block 600).

Figure 7:
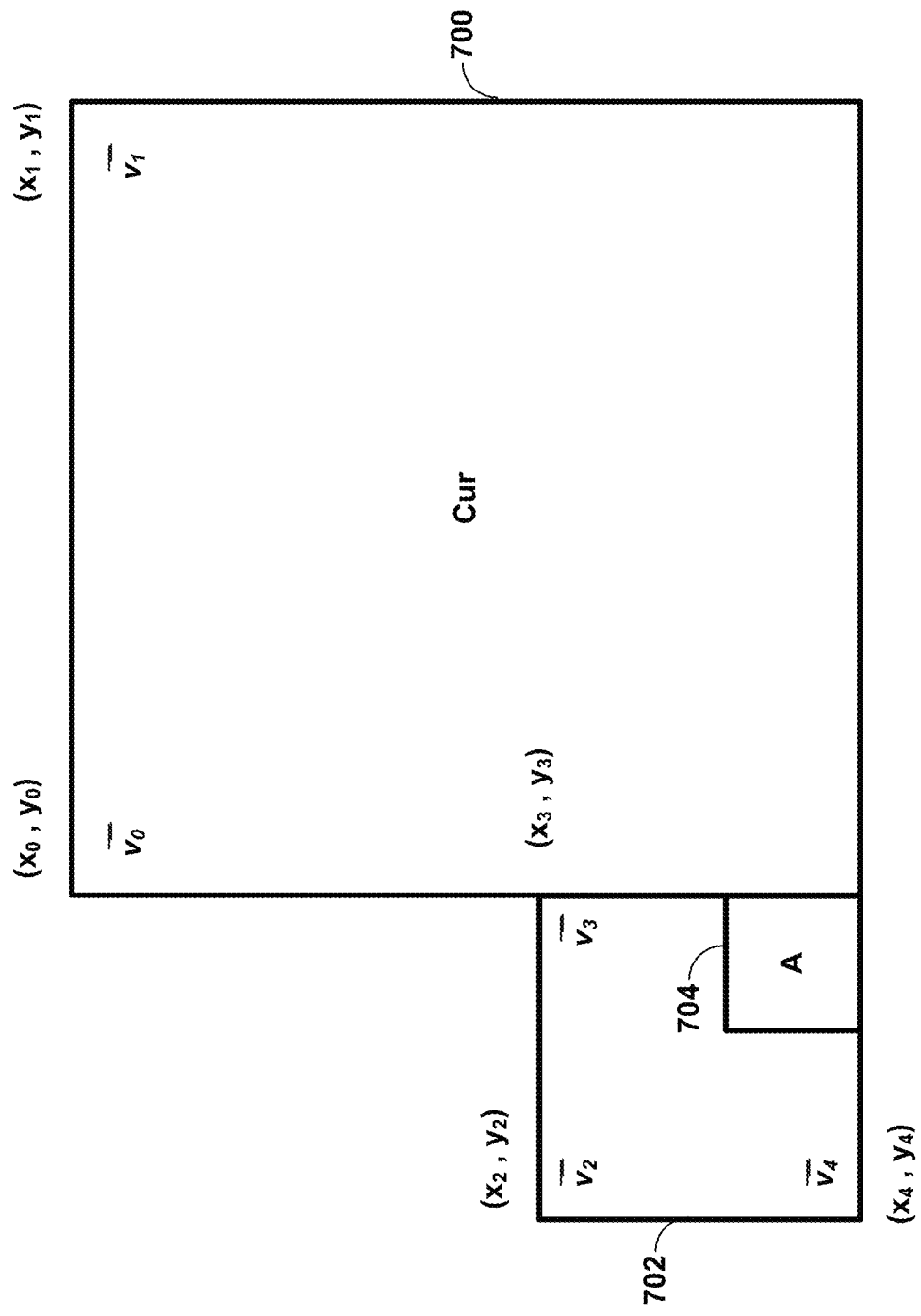
FIG. 7 is a conceptual diagram illustrating control point motion vector inheritance.

FIG. 7 is a conceptual diagram illustrating control point motion vector inheritance. As shown in FIG. 7, if the neighbour left bottom block 704 (A) is coded in affine mode, the motion vectors $v_2$, $v_3$ and $v_4$ of the top left corner, above right corner and left bottom corner of the CU 702 which contains the block 704 (A) are obtained. When block 704 (A) is coded with a 4-parameter affine model, the two CPMVs of the current CU 700 are calculated according to $v_2$, and $v_3$. In the case that block 704 (A) is coded with a 6-parameter affine model, the three CPMVs of the current CU 700 are calculated according to $v_2$, $v_3$ and $v_4$.

Figure 8:
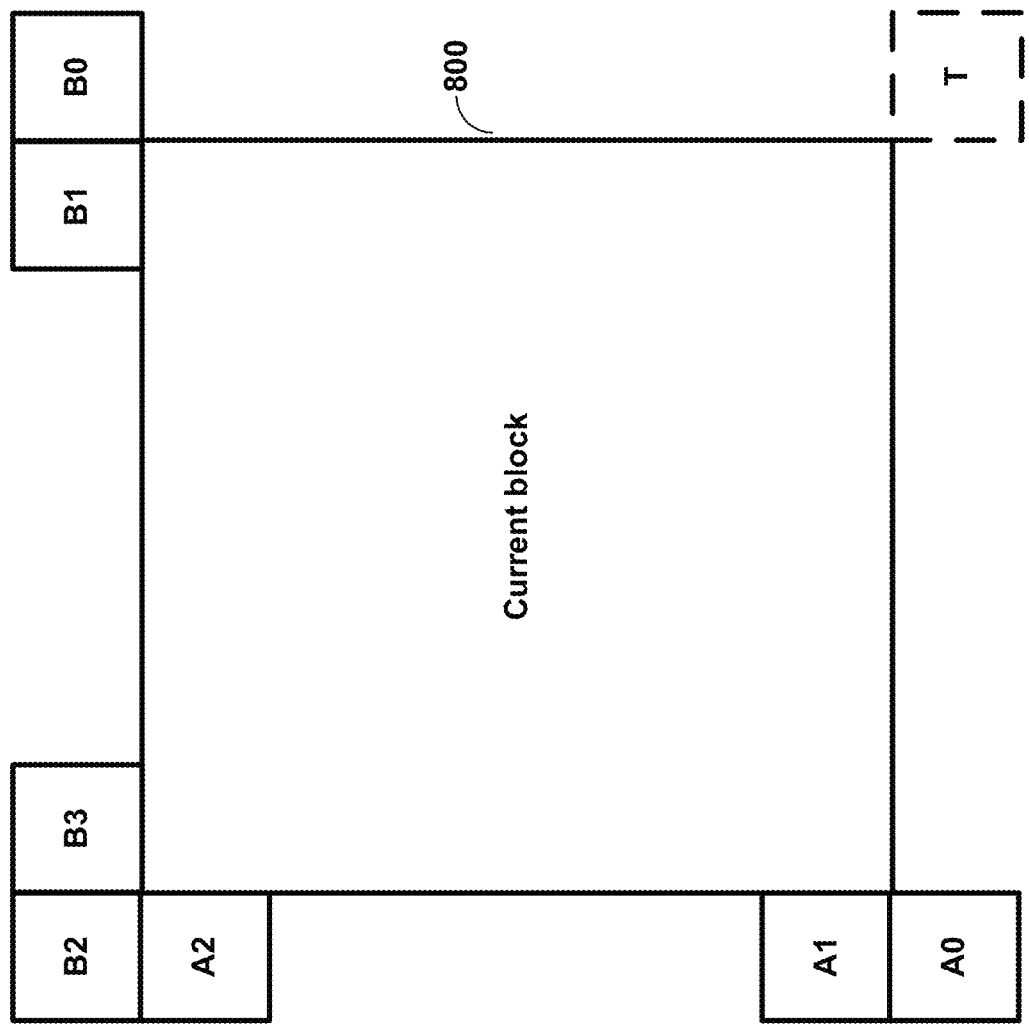
FIG. 8 is a conceptual diagram illustrating locations of candidate positions for constructed affine merge mode.

A constructed affine candidate is a candidate that is constructed by combining the neighbor translational motion information of each control point. The motion information for the control points is derived from the specified spatial neighbors and temporal neighbor shown in FIG. 8. FIG. 8 is a conceptual diagram illustrating locations of candidate positions relative to current block 800 for constructed affine merge mode. $CPMV_k$ (k=1, 2, 3, 4) represents the k-th control point. For $CPMV_1$, the B2→B3→A2 blocks are checked, in that order, and the MV of the first available block is used. For $CPMV_2$, the B1→B0 blocks are checked, in that order, and for $CPMV_3$, the A1→A0 blocks are checked, in that order. For a temporal motion vector predictor (TMVP), the motion information of block T is used as $CPMV_4$ if the motion information is available.

After MVs of four control points are attained, affine merging candidates are constructed based on those motion information. The following combinations of control point MVs are used to construct affine merging candidates, in order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}.

The combination of 3 CPMVs constructs a 6-parameter affine merging candidate and the combination of 2 CPMVs constructs a 4-parameter affine merging candidate. To avoid a motion scaling process, if the reference indices of control points are different, the related combination of control point MVs is discarded.

After inherited affine merging candidates and constructed affine merging candidate are checked, if the affine merge candidate list is still not full (e.g., fewer candidates than prescribed number), zero MVs are inserted to the end of the list.

Triangle Merge Mode

A triangle partition mode has been proposed in VVC for use in inter prediction. In one example, video encoder 200 and video decoder 300 are configured to apply the triangle partition mode only CUs that are 8×8 or larger and are coded in skip or merge mode. For a CU satisfying these conditions, video encoder 200 may signal a CU-level flag to indicate whether the triangle partition mode is applied or not.

When the triangle partition mode is used, video encoder 200 and video decoder 300 are configured to evenly split a CU into two triangle-shaped partitions, using either the diagonal split or the anti-diagonal split. FIG. 9 is a conceptual diagram illustrating triangle partition based inter prediction. In FIG. 9, CU 900 is partitioned with a diagonal split, while CU 902 is partitioned with an anti-diagonal split. Each triangle partition in the CU is inter-predicted using its own motion. Only uni-prediction is allowed for each partition. That is, each partition has one motion vector and one reference picture index. The uni-prediction motion constraint is applied to ensure that, same as the conventional bi-prediction, only two motion compensated predictions are needed for each CU. The uni-prediction motion for each partition is derived from a uni-prediction candidate list constructed using the process described below relating to uni-prediction candidate list construction.

If the CU-level flag indicates that the current CU is coded using the triangle partition mode, an index in the range of [0, 39] is further signaled. Using this triangle partition index, the direction of the triangle partition (diagonal or anti-diagonal), as well as the motion for each of the partitions can be obtained through a look-up table. After predicting each of the triangle partitions, the sample values along the diagonal or anti-diagonal edge are adjusted using a blending processing with adaptive weights. This is the prediction signal for the whole CU, and a transform and quantization process will be applied to the whole CU, as in other prediction modes. Finally, the motion field of a CU predicted using the triangle partition mode is stored in 4×4 units.

Uni-Prediction Candidate List Construction

Figure 10:
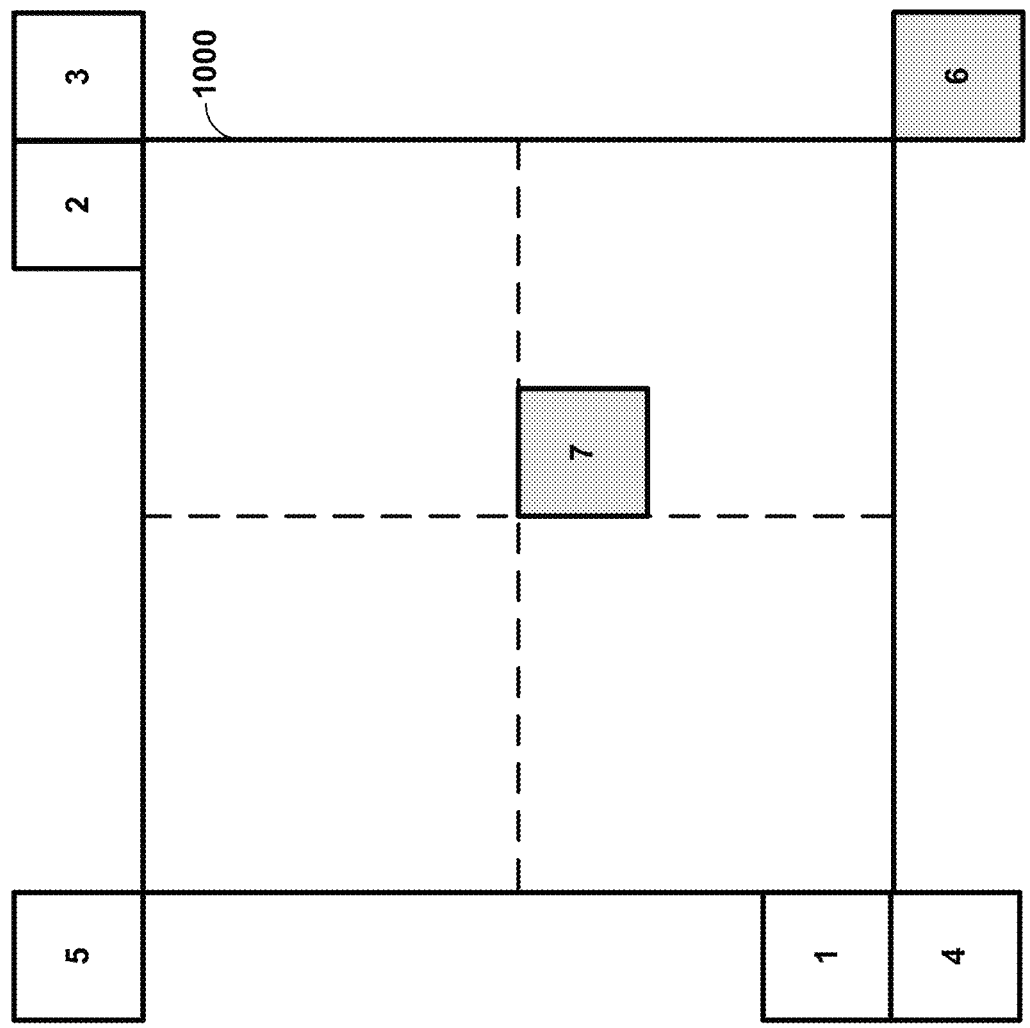
FIG. 10 is a conceptual diagram illustrating spatial and temporal neighboring blocks used to construct a uni-prediction candidate list.

The uni-prediction candidate list includes five uni-prediction motion vector candidates. FIG. 10 is a conceptual diagram illustrating spatial and temporal neighboring blocks relative to current block 1000 used to construct a uni-prediction candidate list. The uni-prediction candidate list is derived from seven neighboring blocks (labeled 1-7 in FIG. 01) including five spatial neighboring blocks (labeled 1 to 5 in FIG. 10) and two temporal co-located blocks (labeled 6 and 7 in FIG. 10). Video encoder 200 and video decoder 300 are configured to obtain the motion vectors of the seven neighboring blocks and store them into the uni-prediction candidate list according to the following order: first, the motion vectors of the uni-predicted neighboring blocks; then, for the bi-predicted neighboring blocks, the list0 (L0) motion vectors (that is, the L0 motion vector part of the bi-prediction MV), the list1 (L1) motion vectors (that is, the L1 motion vector part of the bi-prediction MV), and averaged motion vectors of the L0 and L1 motion vectors of the bi-prediction MVs. If the number of candidates is less than five, zero motion vectors are added to the end of the list.

Combined Inter and Intra Prediction (CIIP)

When a CU is coded in merge mode, and if the CU contains at least 64 luma samples (that is, the CU width times the CU height is equal to or larger than 64), video encoder 200 may signal an additional flag to indicate if the combined inter/intra prediction (CIIP) mode is applied to the current CU.

In order to form the CIIP prediction for CIIP mode, an intra prediction mode is first derived from two additional syntax elements. Up to four possible intra prediction modes can be used: DC, planar, horizontal, or vertical. Then, video encoder 200 and video decoder 300 may derive the inter prediction and intra prediction signals using regular intra and inter decoding processes. Finally, video encoder 200 and video decoder 300 may perform weighted averaging of the inter and intra prediction signals to obtain the CIIP prediction.

Intra Prediction Mode Derivation for CIIP

Up to 4 intra prediction modes, including DC, PLANAR, HORIZONTAL, and VERTICAL modes, can be used to predict the luma component in the CIIP mode. If the CU shape is very wide (that is, width is more than two times of height), then the HORIZONTAL mode is not allowed. If the CU shape is very narrow (that is, height is more than two times of width), then the VERTICAL mode is not allowed. In these cases, only 3 intra prediction modes are allowed.

The CIIP mode uses the 3 most probable modes (MPM) for intra prediction. The CIIP MPM candidate list is formed as follows:

The left and top neighbouring blocks are set as A and B, respectively

The intra prediction modes of block A and block B, denoted as intraModeA and intraModeB, respectively, are derived as follows:

Let X be either A or B intraModeX is set to DC if 1) block X is not available; or 2) block X is not predicted using the CIIP mode or the intra mode; 3) block B is outside of the current CTU otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34)

If intraModeA and intraModeB are the same:

If intraModeA is PLANAR or DC, then the three MPMs are set to {PLANAR, DC, VERTICAL} in that order Otherwise, the three MPMs are set to {intraModeA, PLANAR, DC} in that order Otherwise (intraModeA and intraModeB are different):

The first two MPMs are set to {intraModeA, intraModeB} in that order

Uniqueness of PLANAR, DC and VERTICAL is checked in that order against the first two MPM candidate modes; as soon as a unique mode is found, it is added to as the third MPM If the CU shape is very wide or very narrow, as defined above, video decoder 300 may infer the MPM flag to be 1 without signaling. Otherwise, an MPM flag is signalled to indicate if the CIIP intra prediction mode is one of the CIIP MPM candidate modes.

If the MPM flag is 1, video encoder 200 further signals an MPM index to indicate which one of the MPM candidate modes is used in CIIP intra prediction. Otherwise, if the MPM flag is 0, the intra prediction mode is set to the "missing" mode in the MPM candidate list. For example, if the PLANAR mode is not in the MPM candidate list, then PLANAR is the missing mode, and the intra prediction mode is set to PLANAR. Since 4 possible intra prediction modes are allowed in CIIP, and the MPM candidate list contains only 3 intra prediction modes, one of the 4 possible modes must be the missing mode.

For the chroma components, the DM mode is always applied without additional signaling. That is, video encoder 200 and video decoder 300 use the same prediction mode for chroma samples as was used for luma samples.

The intra prediction mode of a CIIP-coded CU will be saved and used in the intra mode coding of the future neighbouring CUs.

Combining Inter and Intra Prediction Signals

The inter prediction signal in the CIIP mode $P_{inter}$ is derived using the same inter prediction process applied in regular merge mode. Then the intra prediction signal $P_{intra}$ is derived using the CIIP intra prediction mode following the regular intra prediction process. Then, the intra and inter prediction signals are combined using weighted averaging, where the weight value depends on the intra prediction mode and where the sample is located in the coding block, as follows:

If the intra prediction mode is the DC or planar mode, or if the block width or height is smaller than 4, then equal weights are applied to the intra prediction and the inter prediction signals.

Otherwise, the weights are determined based on the intra prediction mode (either horizontal mode or vertical mode in this case) and the sample location in the block. Take the horizontal prediction mode for example (the weights for the vertical mode are derived similarly but in the orthogonal direction). Denote W as the width of the block and H as the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal is derived using the following equation:

$$P_{CIIP}=((8-wt)*P_{inter}+wt*P_{intra}+4)>>3$$

Intra Block Copy (IBC)

In IBC mode, a motion vector (also called a block vector) points to already reconstructed reference samples in the current picture. Intra block copy (IBC) mode is sometimes referred to as current picture referencing (CPR). Video encoder 200 and video decoder 300 predict a current block from the already reconstructed reference samples in the current picture pointed to by the motion vector (or block vector) in IBC mode. Like regular merge mode for translation inter prediction, the motion vector used in IBC mode may also be predicted from neighboring blocks in an IBC merge mode. For example, video encoder 200 and video decoder 300 may construct an intra block copy merging candidate list for at block of video data. In some examples, as will be explained below, the intra block copy merging candidate list may be based constructed based on a maximum number candidates. Video encoder 200 and video decoder 300 may determine an intra block copy merging candidate from the intra block copy merging candidate list, determine a block vector associated with the intra block copy merging candidate, and code the block of video data using the determined block vector. That is, video encoder 200 and video decoder 300 may locate a predictive block in the same picture as the block being coded using the block vector, and may perform a prediction process for the block being coded using the predictive block.

Syntax for Merge Data

The syntax for merge data including extended merge data, MMVD data, Affine merge data, triangle merge data, and CIIP data in VVC Draft 4 is shown in Table 3.

TABLE 3

| Syntax for merge data |  |
| --- | --- |
| Section 7.3.2.1 in VVC Draft 4 |  |
|  | Descriptor |
| seq_parameter_set_rbsp( ) { | |
| ... | |
|   sps_temporal_mvp_enabled_flag | u(1) |
|   if( sps_temporal_mvp_enabled_flag ) | |
|     sps_sbtmvp_enabled_flag | u(1) |
| ... | |
|   sps_ibc_enabled_flag | u(1) |
|   sps_ciip_enabled_flag | u(1) |

TABLE 3-continued

| Syntax for merge data | |
|---|---|
| sps_fpel_mmvd_enabled_flag | u(1) |
| sps_triangle_enabled_flag | u(1) |
| ... | |
| } | |

Section 7.3.4.1 in VVC Draft 4

| | Descriptor |
|---|---|
| tile_group_header( ) { | |
| ... | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B) | |
|       collocated_from_l0_flag | u(1) |
|   } | |
|   if( ( weighted_pred_flag && tile_group_type = = P) \|\| | |
|     ( weighted_bipred_flag && tile_group = = B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| } else if ( sps_ibc_enabled_flag ) | |
|   six_minus_max_num_merge_cand | ue(v) |
| ... | |
| } | |

Section 7.3.6.8 in VVC Draft 4

| | Descriptor |
|---|---|
| merge_data( x0, y0, cbWidth, cbHeight) { | |
|   if ( CuPredMode[ x0 ][ y0 ] = = MODE_IBC ) { | |
|     if( MaxNumMergeCand > 1) | |
|       merge_idx[ x0 ][ y0 ] | ae(v) |
|   } else { | |
|     mmvd_flag[ x0 ][ y0 ] | ae(v) |
|     if( mmvd_flag[ x0 ][ y0 ] = = 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8) | |
|         merge_subblock_flag[ x0 ][ y0 ] | ae(v) |
|       if( merge_subblock_flag[ x0 ][ y0 ] = = 1) { | |
|         if( MaxNumSubblockMergeCand > 1) | |
|           merge_subblock_idx[ x0 ][ y0 ] | ae(v) |
|       } else { | |
|         if( sps_ciip_enabled_flag && cu_skip_flag[ x0 ][ y0 ] = = 0 && | |
|           ( cbWidth * cbHeight ) >= 64 && cbWidth < 128 && cbHeight < 128 ) { | |
|           ciip_flag[ x0 ][ y0 ] | ae(v) |
|         if( ciip_flag[ x0 ][ y0 ]) { | |
|           if ( cbWidth <= 2 * cbHeight \|\| cbHeight <= 2 * cbWidth) | |
|             ciip_luma_mpm_flag[ x0 ][ y0 ] | ae(v) |
|           if( ciip_luma_mpm_flag[ x0 ][ y0 ]) | |
|             ciip_luma_mpm_idx[ x0 ][ y0 ] | ae(v) |
|         } | |
|       } | |
|       if( sps_triangle_enabled_flag && tile_group_type = = B && | |
|         ciip_flag[ x0 ][ y0 ] = = 0 && cbWidth * cbHeight >= 64) | |
|         merge_triangle_flag[ x0 ][ y0 ] | ae(v) |
|       if( merge_triangle_flag[ x0 ][ y0 ]) { | |
|         merge_triangle_split_dir[ x0 ][ y0 ] | ae(v) |
|         merge_triangle_idx0[ x0 ][ y0 ] | ae(v) |

TABLE 3-continued

Syntax for merge data

```
              merge_triangle_idx1[ x0 ][ y0 ]                    ae(v)
          } else if( MaxNumMergeCand > 1 )
              merge_idx[ x0 ][ y0 ]                              ae(v)
          }
        }
      }
    }
```

The merge data semantics are shown as below:

sps_temporal_mvp_enabled_flag equal to 1 specifies that tile_group_temporal_mvp_enabled_flag is present in the tile group headers of tile groups with tile_group_type not equal to I in the CVS. sps_temporal_mvp_enabled_flag equal to 0 specifies that tile_group_temporal_mvp_enabled_flag is not present in tile group headers and that temporal motion vector predictors are not used in the CVS.

sps_sbtmvp_enabled_flag equal to 1 specifies that subblock-based temporal motion vector predictors may be used in decoding of pictures with all tile groups having tile_group_type not equal to I in the CVS. sps_sbtmvp_enabled_flag equal to 0 specifies that subblock-based temporal motion vector predictors are not used in the CVS. When sps_sbtmvp_enabled_flag is not present, it is inferred to be equal to 0.

sps_ibc_enabled_flag equal to 1 specifies that current picture referencing may be used in decoding of pictures in the CVS. sps_ibc_enabled_flag equal to 0 specifies that current picture referencing is not used in the CVS. When sps_ibc_enabled_flag is not present, it is inferred to be equal to 0.

sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_triangle_enabled_flag specifies whether triangular shape based motion compensation can be used for inter prediction. sps_triangle_enabled_flag equal to 0 specifies that the syntax shall be constrained such that no triangular shape based motion compensation is used in the CVS, and merge_triangle_flag, merge_triangle_split_dir, merge_triangle_idx0, and merge_triangle_idx1 are not present in coding unit syntax of the CVS. sps_triangle_enabled_flag equal to 1 specifies that triangular shape based motion compensation can be used in the CVS.

tile_group_temporal_mvp_enabled_flag specifies whether temporal motion vector predictors can be used for inter prediction. If tile_group_temporal_mvp_enabled_flag is equal to 0, the syntax elements of the current picture shall be constrained such that no temporal motion vector predictor is used in decoding of the current picture. Otherwise (tile_group_temporal_mvp_enabled_flag is equal to 1), temporal motion vector predictors may be used in decoding of the current picture. When not present, the value of tilegroup_temporal_mvp_enabled_flag is inferred to be equal to 0.

mvd_l1_zero_flag equal to 1 indicates that the mvd_coding(x0, y0, 1) syntax structure is not parsed and MvdL1[x0][y0][compIdx] is set equal to 0 for compIdx=0 . . . 1.

mvd_l1_zero_flag equal to 0 indicates that the mvd_coding (x0, y0, 1) syntax structure is parsed.

collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1. When collocated_from_l0_flag is not present, it is inferred to be equal to 1.

six_minus_max_num_merge_cand specifies the maximum number of merging motion vector prediction (MVP) candidates supported in the tile group subtracted from 6. The maximum number of merging MVP candidates, MaxNumMergeCand is derived as follows:

$$MaxNumMergeCand=6-six\_minus\_max\_num\_merge\_cand$$

The value of MaxNumMergeCand shall be in the range of 1 to 6, inclusive.

five_minus_max_num_subblock_merge_cand specifies the maximum number of subblock-based merging motion vector prediction (MVP) candidates supported in the tile group subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

$$MaxNumSubblockMergeCand=5-five\_minus\_max\_num\_subblock\_merge\_cand$$

The value of MaxNumSubblockMergeCand shall be in the range of 0 to 5, inclusive.

tile_group_fpel_mmvd_enabled_flag equal to 1 specifies that merge mode with motion vector difference uses integer sample precision in the current tile group. tile_group_fpel_mmvd_enabled_flag equal to 0 specifies that merge mode with motion vector difference can use fractional sample precision in the current tile group. When not present, the value of tile_group_fpel_mmvd_enabled_flag is inferred to be 0.

mmvd_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_flag[x0][y0] is not present, it is inferred to be equal to 0.

mmvd_merge_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

mmvd_distance_idx[x0][y0] specifies the index used to derive MmvdDistance[x0][y0] as specified in Table 4. The array indices x0, y0 specify the location (x0, y0) of the top-left luma sample of the considered coding block relative to the top-left luma sample of the picture.

TABLE 4

Specification of MmvdDistance[ x0 ][ y0 ] based on mmvd_distance_idx[ x0 ][ y0 ].

| mmvd_distance_idx [ x0 ][ y0 ] | MmvdDistance[ x0 ][ y0 ] | |
|---|---|---|
| | tile_group_fpel_ mmvd_enabled_ flag == 0 | tile_group_fpel_ mmvd_enabled_ flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 | mmvd_direction_idx[x0][y0] specifies index used to derive MmvdSign[x0][y0] as specified in Table 5. The array indices x0, y0 specify the location (x0, y0) of the top-left luma sample of the considered coding block relative to the top-left luma sample of the picture.

TABLE 5

Specification of MmvdSign[ x0 ][ y0 ] based on mmvd_direction_idx[ x0 ][ y0 ]

| mmvd_direction_idx [ x0 ][ y0 ] | MmvdSign [ x0 ][ y0 ][0] | MmvdSign [ x0 ][ y0 ][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

MmvdOffset[$x0$][$y0$][0]=(MmvdDistance[$x0$][$y0$]<<2)*MmvdSign[$x0$][$y0$][0]

MmvdOffset[$x0$][$y0$][1]=(MmvdDistance[$x0$][$y0$]<<2)*MmvdSign[$x0$][$y0$][1]

merge_subblock_flag[x0][y0] specifies whether the subblock-based inter prediction parameters for the current coding unit are inferred from neighbouring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

The syntax elements ciip_luma_mpm_flag[x0][y0], and ciip_luma_mpm_idx[x0][y0] specify the intra prediction mode for luma samples used in combined inter-picture merge and intra-picture prediction. The array indices x0, y0 specify the location (x0, y0) of the top-left luma sample of the considered coding block relative to the top-left luma sample of the picture. The intra prediction mode is derived according to clause 8.5.6.

When ciip_luma_mpm_flag[x0][y0] is not present, it is inferred as follows:
   If cbWidth is greater than 2*cbHeight or cbHeight is greater than 2*cbWidth, ciip_luma_mpm_flag[x0][y0] is inferred to be equal to 1.
   Otherwise, ciip_luma_mpm_flag[x0][y0] is inferred to be equal to 0.

merge_triangle_flag[x0][y0] equal to 1 specifies that for the current coding unit, when decoding a B tile group, triangular shape based motion compensation is used to generate the prediction samples of the current coding unit. merge_triangle_flag[x0][y0] equal to 0 specifies that the coding unit is not predicted by triangular shape based motion compensation. When merge_triangle_flag[x0][y0] is not present, it is inferred to be equal to 0.

merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.

merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.

merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:
   If mmvd_flag[x0][y0] is equal to 1, merge_idx[x0][y0] is inferred to be equal to mmvd_merge_flag[x0][y0].
   Otherwise (mmvd_flag[x0][y0] is equal to 0), merge_idx[x0][y0] is inferred to be equal to 0.

It may be a requirement of bitstream conformance that when the reference picture corresponding to ref_idx_l0[x0][y0] for the current coding unit is the current decoded picture, mmvd_flag[x0][y0], merge_subblock_flag[x0][y0], ciip_flag[x0][y0] and merge_triangle_flag[x0][y0] shall all be equal to 0.

Problem

In VVC Draft 4, there are slice-level syntax elements to define the maximum number of subblock merging candidates (e.g., MaxNumSubblockMergeCand) and the maximum number of triangle merging candidates (e.g., MaxNumTriangleMergeCand) in addition to the maximum number of the inter-prediction merge candidates for regular, translational inter prediction (e.g., MaxNumMergeCand). A smaller number of merging candidates leads to lower implementation complexity at video encoder 200 and video decoder 300, and multiple syntax elements to configure the different merging list sizes at the slice level benefits encoder flexibility. However, the maximum number of intra block copy (IBC) merging candidates, e.g., MaxNumIntraBlockCopyMergeCand, is currently set to be the same as the maximum number of inter-prediction merge candidates (i.e., MaxNumMergeCand) in VVC Test Model 5.0 (VTM5.0). This is not a desirable design and may lead to drawbacks in encoder/decoder flexibility and coding efficiency.

In view of the foregoing, this disclosure describes techniques that include coding a new syntax element to indicate a value used to derive a maximum number of intra block copy merging candidates (e.g., MaxNumIntraBlockCopyMergeCand) for intra block copy mode. As described above, intra block copy mode is a prediction mode in which blocks of video data in a current picture are predicted from other blocks in the current picture, where the predictive blocks are identified by a block vector (e.g., similar to a motion vector, but pointing to a location in the same picture).

In examples of the disclosure, video encoder 200 and video decoder 300 may be configured to code (i.e., encode or decode, respectively) a syntax element that indicates, either directly or indirectly, the maximum number of intra block copy merging candidates that are to be used to determine motion/block vectors used code a portion of video data (e.g., a block, slice, picture, etc.). This syntax element is separate from any syntax elements that may indicate a maximum number of merging candidates for other prediction modes (e.g., regular merge inter prediction). By using a separate syntax element for the maximum number of intra block copy merging candidates for intra block copy mode, the techniques of this disclosure may provide for more flexibility and/or coding efficiency when coding video data using intra block copy mode.

For example, coding video data using intra block copy mode may be performed with higher coding efficiency using fewer merging candidates than regular merge mode for natural content. Conversely, coding video data using intra block copy mode may be performed with higher coding efficiency using more merging candidates than regular merge mode for screen content. Having a separate syntax element that indicates the maximum number of intra block copy merging candidates for intra block copy mode may provide for flexibility and may increase coding efficiency for video codecs that deal with multiple different types of content (e.g., natural vs. screen content).

Several proposed changes relative to VVC Draft 4 that may improve signaling of intra block copy syntax are described below.

Technique 1:

In one example of the disclosure, video encoder 200 and video decoder 300 may be configured to code (i.e., encode and decode, respectively) a slice-level (or other level) syntax element constant_minus_max_num_ibc_merge_cand that specifies the maximum number of intra block copy merging candidates supported in the slice subtracted from N, where N is a pre-assigned fixed constant such as 5 or 6. That is, in general, the constant_minus_max_num_ibc_merge_cand is a syntax element whose value is used to derive a maximum number of intra block copy merging candidates. For example, video decoder 300 may derive the maximum number of intra block copy merging candidates based on the value of the first sytnax element subtracted from N (e.g., 5, 6, or another value). That is, video decoder 300 derives the maximum number of intra block copy merging candidates, MaxNumIntraBlockCopyMergeCand, as follows:

$$MaxNumIntraBlockCopyMergeCand = N - \text{constant\_minus\_max\_num\_ibc\_merge\_cand}$$

In one example, the value of MaxNumIntraBlockCopyMergeCand is limited to be in the range of 0 to N, inclusive, and video decoder 300 is configured to set the value of MaxNumIntraBlockCopyMergeCand to 0 if constant_minus_max_num_ibc_merge_cand is not available. Another example is to set the value of MaxNumIntraBlockCopyMergeCand in the range of 1 to N, inclusive, and video decoder 300 is configured to set the value of MaxNumIntraBlockCopyMergeCand to 1 if constant_minus_max_num_ibc_merge_cand is not available.

Accordingly, in one example of the disclosure, video encoder 200 and video decoder 300 are configured to code a first syntax element (e.g., constant_minus_max_num_ibc_merge_cand) that specifies a value used to derive a maximum number of intra block copy merging candidates. Video decoder 300 may be configured to derive the maximum number of intra block copy merging candidates based on the value of the first sytnax element. In one example, the maximum number of intra block copy merging candidates ranges from 1 to 6. Video decoder 300 may be configured to subtract the value of the first sytnax element from 6 to derive the maximum number of intra block copy merging candidates. Video encoder 200 and video decoder 300 may then code the first block of video data using intra block copy mode according to the maximum number of intra block copy merging candidates.

As is shown in the syntax below, to code the first syntax element that specifies the value used to derive the maximum number of intra block copy merging candidates, video encoder 200 and video decoder 300 may first be configured to code an intra block copy enabled flag (e.g., sps_ibc_enabled_flag). The sps_ibc_enabled_flag indicates if intra block copy mode is enabled for the blocks of video data corresponding to the sequence parameter set in which the sps_ibc_enabled_flag was sent. Video encoder 200 and video decoder 300 may then code the first syntax element (e.g., constant_minus_max_num_ibc_merge_cand) that specifies the value used to derive the maximum number of intra block copy merging candidates based on the intra block copy enabled flag indicating that intra block copy mode is enabled for the first block of video data (e.g., blocks of video data in a sequence including the first block)

To code the first block of video data, video encoder 200 and video decoder 300 may construct an intra block copy merging candidate list for the first block of video data based on the derived maximum number of intra block copy merging candidates. That is, video encoder 200 and video decoder 300 will construct an intra block copy merging candidate list with merging candidate up to the maximum number. Video encoder 200 may also code a merge index (merge_idx) into the intra block copy merging candidate list based on the maximum number of intra block copy merging candidates being greater than one. The merge index indicates which of the candidates in the intra block copy merging candidate is to be used to obtain a block vector for coding the first block of video data. If the intra block copy merging candidate list only includes one candidate there is no need to code a merge index, as the candidate is known.

Video encoder 200 and video decoder 300 may determine an intra block copy merging candidate from the intra block copy merging candidate list (e.g., from the merge_idx or from a single candidate if the merge candidate list has only one candidate), determine a block vector associated with the intra block copy merging candidate, and code the first block of video data using the determined block vector. For example, video encoder 200 may use the block vector to identify a predictive block. Video encoder 200 may subtract the predictive block from the first block to produce a residual block. Video encoder 200 may then encode the residual block as described above. Video decoder 300 may also use the block vector to identify the predictive block. Video decoder 300 may decode a residual block as described above and add the predictive block to the residual block to obtain a decoded block.

As can be seen in the sytnax below, the first syntax element (e.g., constant_minus_max_num_ibc_merge_cand) that specifies the value used to derive the maximum number of intra block copy merging candidates is different than a second syntax element (e.g., six_minus_max_num_merge_cand) that specifies a value used to derive a maximum number of inter-prediction merge candidates used for regular, translation inter-prediction. As such, video encoder 200 and video decoder 300 may be further configured to code a second syntax element that specifies the value used to derive the maximum number of inter-prediction merge candidates, and code a second block of video data using inter-prediction merge mode according to the maximum number of inter-prediction merge candidates specified by the second syntax element.

The proposed syntax change to relative VVC Draft 4 is shown in the table below, where additions are shown between tags <ADD> and </ADD>. Deletions from VVC Draft 4 are shown between tags <DEL> and </DEL>.

| Section 7.3.4.1 | |
|---|---|
| tile_group_header( ) { | Descriptor |
| ... | |
| if( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   if( ( weighted_pred_flag && tile_group_type = = P ) \|\| | |
|     ( weighted_bipred_flag && tile_group = = B ) ) | |
|     pred_weight_table( ) | |
|   six_minus_max_num_merge_cand | ue(v) |
|   if( sps_affine_enabled_flag ) | |
|     five_minus_max_num_subblock_merge_cand | ue(v) |
|   if( sps_fpel_mmvd_enabled_flag ) | |
|     tile_group_fpel_mmvd_enabled_flag | u(1) |
| <DEL>} else if ( sps_ibc_enabled_flag ) | |
|   six_minus_max_num_merge_cand | ue(v) </DEL> |
| <ADD>if ( sps_ibc_enabled_flag ) | |
|   constant_minus_max_num_ibc_merge_cand | ue(v) </ADD> |
| ... | |
| } | |

| Section 7.3.6.8 | |
|---|---|
| merge_data( x0, y0, cbWidth, cbHeight ) { | Descriptor |
|   if( CuPredMode[ x0 ][ y0 ] = = MODE_IBC ) { | |
|   <DEL>if( MaxNumMergeCand > 1 ) </DEL> | |
|   <ADD> if(MaxNumIntraBlockCopyMergeCand > 1 ) </ADD> | |
|     merge_idx[ x0 ][ y0 ] | ae(v) |
|   } else { | |
|     mmvd_flag[ x0 ][ y0 ] | ae(v) |
|     if( mmvd_flag[ x0 ][ y0 ] = = 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] = = 1) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && cu_skip_flag[ x0 ][ y0 ] = = 0 && ( cbWidth * cbHeight) >= 64 && cbWidth < 128 && cbHeight < 128) { | |
|           ciip_flag[ x0 ][ y0 ] | ae(v) |
|           if( ciip_flag[ x0 ][ y0 ] ) { | |

-continued

```
            if ( cbWidth <= 2 * cbHeight || cbHeight <= 2 * cbWidth)
                ciip_luma_mpm_flag[ x0 ][ y0 ]                                ae(v)
            if( ciip_luma_mpm_flag[ x0 ][ y0 ] )
                ciip_luma_mpm_idx[ x0 ][ y0 ]                                 ae(v)
          }
        }
        if( sps_triangle_enabled_flag && tile_group_type = = B &&
            ciip_flag[ x0 ][ y0 ] = = 0 && cbWidth * cbHeight >= 64)
            merge_triangle_flag[ x0 ][ y0 ]                                   ae(v)
        if( merge_triangle_flag[ x0 ][ y0 ] ) {
            merge_triangle_split_dir[ x0 ][ y0 ]                              ae(v)
            merge_triangle_idx0[ x0 ][ y0 ]                                   ae(v)
            merge_triangle_idx1[ x0 ][ y0 ]                                   ae(v)
        } else if( MaxNumMergeCand > 1 )
            merge_idx[ x0 ][ y0 ]                                             ae(v)
      }
    }
  }
}
```

Technique 2:

In another example of the disclosure, video encoder 200 and video decoder 300 are configured to allow the ranges of MaxNumIntraBlockCopyMergeCand to be different for the case of a tile_group_type equal to I and the case of tile_group_type not equal to I. A tile_group_type equal to I indicates that all blocks in the tile are coded using an intra prediction mode, including an intra block copy mode. On top of Technique 1, the maximum number of intra block copy merging candidates, MaxNumIntraBlockCopyMergeCand, is derived as follows:

MaxNumIntraBlockCopyMergeCand=$N$-constant_minus_max_num_ibc_merge_cand, where N is a positive constant, such as 5 or 6. If tile_group_type equal to I, the value of MaxNumIntraBlockCopyMergeCand shall be in the range of 0 to N, inclusive, and MaxNumIntraBlockCopyMergeCand is set as 0 if constant_minus_max_num_ibc_merge_cand is not available. Otherwise, (tile_group_type not equal to I), the value of MaxNumIntraBlockCopyMergeCand shall be in the range of 1 to N, inclusive, and MaxNumIntraBlockCopyMergeCand is set as 1 if constant_minus_max_num_ibc_merge_cand is not available.

Another example is as follows: If tile_group_type is equal to I, the value of MaxNumIntraBlockCopyMergeCand shall be in the range of 1 to N, inclusive, and MaxNumIntraBlockCopyMergeCand is set as 1 if constant_minus_max_num_ibc_merge_cand is not available. Otherwise, (tile_group_type not equal to I), the value of MaxNumIntraBlockCopyMergeCand shall be in the range of 0 to N, inclusive, and MaxNumIntraBlockCopyMergeCand is set as 0 if constant_minus_max_num_ibc_merge_cand is not available.

Technique 3:

In another example of the disclosure, video encoder 200 and video decoder 300 are configured to set MaxNumMergeCand as the upper bound of MaxNumIntraBlockCopyMergeCand in the case of tile_group_type not equal to I. On top of Technique 1, the maximum number of intra block copy merging candidates, MaxNumIntraBlockCopyMergeCand, is derived as follows:

MaxNumIntraBlockCopyMergeCand=$N$-constant_minus_max_num_ibc_merge_cand, where N is a positive constant such as 5 or 6 in the case of tile_group_type equal to I, and N is set as MaxNumMergeCand in the case of tile_group_type not equal to I. If tile_group_type equal to I. The value of MaxNumIntraBlockCopyMergeCand shall be in the range of 0 to N or 1 to N as described in the examples in Technique 1. If tile_group_type not equal to I, the value of MaxNumIntraBlockCopyMergeCand shall be in the range of 0 to MaxNumMergeCand, inclusive, and MaxNumIntraBlockCopyMergeCand is set as 0 if constant_minus_max_num_ibc_merge_cand is not available.

The proposed syntax change to relative VVC Draft 4 is shown in the table below, where additions are shown between tags <ADD> and </ADD>. Deletions from VVC Draft 4 are shown between tags <DEL> and </DEL>.

| Section 7.3.4.1 | |
|---|---|
| tile_group_header ( ) { | Descriptor |
| ... | |
| if ( tile_group_type != I ) { | |
|   if( sps_temporal_mvp_enabled_flag ) | |
|     tile_group_temporal_mvp_enabled_flag | u(1) |
|   if( tile_group_type = = B ) | |
|     mvd_l1_zero_flag | u(1) |
|   if( tile_group_temporal_mvp_enabled_flag ) { | |
|     if( tile_group_type = = B ) | |
|       collocated_from_l0_flag | u(1) |
|   } | |
|   if( ( weighted_pred_flag && tile_group_type = = P ) \|\| | |
|     ( weighted_bipred_flag && tile_group = = B ) ) | |
|     pred_weight_table( ) | |
|   six_minus_max_num_merge_cand | ue(v) |
|   if( sps_affine_enabled_flag) | |

| -continued | |
|---|---|
| five_minus_max_num_subblock_merge_cand | ue(v) |
| if( sps_fpel_mmvd_enabled_flag ) | |
|     tile_group_fpel_mmvd_enabled_flag | u(1) |
| <DEL> } else if ( sps_ibc_enabled_flag ) | |
|     six_minus_max_num_merge_cand</DEL> | ue(v) |
| <ADD> if ( sps_ibc_enabled_flag ) | |
|     constant_minus_max_num_ibc_merge_cand<ADD> | ue(v) |
| ... | |
| } | |

| Section 7.3.6.8 | |
|---|---|
| merge_data( x0, y0, cbWidth, cbHeight ) { | Descriptor |
|   if( CuPredMode[ x0 ][ y0 ] = = MODE_IBC) { | |
|   <DEL>if( MaxNumMergeCand > 1 ) </DEL> | |
|   <ADD> if(MaxNumIntraBlockCopyMergeCand > 1 ) </ADD> | |
|     merge_idx[ x0 ][ y0 ] | ae(v) |
|   } else { | |
|     mmvd_flag[ x0 ][ y0 ] | ae(v) |
|     if( mmvd_flag[ x0 ][ y0 ] = = 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] = = 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && cu_skip_flag[ x0 ][ y0 ] = = 0 && | |
|         ( cbWidth * cbHeight ) >= 64 && cbWidth < 128 && cbHeight < 128) { | |
|           ciip_flag[ x0 ][ y0 ] | ae(v) |
|           if( ciip_flag[ x0 ][ y0 ] ) { | |
|             if ( cbWidth <= 2 * cbHeight || cbHeight <= 2 * cbWidth ) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ][ y0 ] | ae(v) |
|           } | |
|         } | |
|         if( sps_triangle_enabled_flag && tile_group_type = = B && | |
|           ciip_flag[ x0 ][ y0 ] = = 0 && cbWidth * cbHeight >= 64 ) | |
|           merge_triangle_flag[ x0 ][ y0 ] | ae(v) |
|         if( merge_triangle_flag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } else if( MaxNumMergeCand > 1 ) | |
|           merge_idx[ x0 ][ y0 ] | ae(v) |
|         } | |
|       } | |
|     } | |
|   } | |
| } | |

In another example of the disclosure, the maximum number of intra block copy merging candidates, MaxNumIntraBlockCopyMergeCand, is derived as follows:

MaxNumIntraBlockCopyMergeCand=N−constant_minus_max_num_ibc_merge_cand, where N is a positive constant such as 5 or 6 in the case of tile_group_type equal to I, and N is set as MaxNumMergeCand in the case of tile_group_type not equal to. If the tile_group_type not equal to I, the value of MaxNumIntraBlockCopyMergeCand shall be in the range of 1 to N, inclusive, and MaxNumIntraBlockCopyMergeCand is set as 1 if constant_minus_max_num_ibc_merge_cand is not available. If tile_group_type not equal to I, the value of MaxNumIntraBlockCopyMergeCand shall be in the range of 1 to MaxNumMergeCand, inclusive, and MaxNumIntraBlockCopyMergeCand is set as 1 if constant_minus_max_num_ibc_merge_cand is not available. In this example, video decoder only parses the syntax element constant_minus_max_num_ibc_merge_cand if MaxNumMergeCand>1 in the case of tile_group_type not equal to I.

The proposed syntax change to relative VVC Draft 4 is shown in the table below, where additions are shown between tags <ADD> and </ADD>. Deletions from VVC Draft 4 are shown between tags <DEL> and </DEL>.

| Section 7.3.4.1 | |
| --- | --- |
| tile_group_header ( ) { | Descriptor |
| ... | |
|   if ( tile_group_type != I ) { | |
|     if( sps_temporal_mvp_enabled_flag ) | |
|       tile_group_temporal_mvp_enabled_flag | u(1) |
|     if( tile_group_type == B ) | |
|       mvd_l1_zero_flag | u(1) |
|     if( tile_group_temporal_mvp_enabled_flag ) { | |
|       if( tile_group_type == B ) | |
|         collocated_from_l0_flag | u(1) |
|     } | |
|     if( ( weighted_pred_flag && tile_group_type == P ) \|\| | |
|       ( weighted_bipred_flag && tile_group == B ) ) | |
|       pred_weight_table( ) | |
|     six_minus_max_num_merge_cand | ue(v) |
|     if( sps_affine_enabled_flag ) | |
|       five_minus_max_num_subblock_merge_cand | ue(v) |
|     if( sps_fpel_mmvd_enabled_flag ) | |
|       tile_group_fpel_mmvd_enabled_flag | u(1) |
|   <DEL> } else if ( sps_ibc_enabled_flag ) | |
|     six_minus_max_num_merge_cand</DEL> | ue(v) |
|   <ADD> if ( sps_ibc_enabled_flag && (tile_group_type == I\|\| | |
|   (tile_group_type != I && MaxNumMergeCand > 1 ) ) ) | |
|     constant_minus_max_num_ibc_merge_cand | ue(v) </ADD> |
| ... | |
| } | |

| Section 7.3.6.8 | |
| --- | --- |
| merge_data( x0, y0, cbWidth, cbHeight ) { | Descriptor |
|   if( CuPredMode[ x0 ][ y0 ] == MODE_IBC) { | |
|     <DEL>*if( MaxNumMergeCand > 1 )*</DEL> | |
|     <ADD> if(MaxNumIntraBlockCopyMergeCand > 1 ) </ADD> | |
|       merge_idx[ x0 ][ y0 ] | ae(v) |
|   } else { | |
|     mmvd_flag[ x0 ][ y0 ] | ae(v) |
|     if( mmvd_flag[ x0 ][ y0 ] == 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] == 1 ) { | |
|         if( MaxNumSubblockMergeCand > 1 ) | |
|           merge_subblock_idx[ x0 ][ y0 ] | ae(v) |
|       } else { | |
|         if( sps_ciip_enabled_flag && cu_skip_flag[ x0 ][ y0 ] == 0 && | |
|           ( cbWidth * cbHeight ) >= 64 && cbWidth < 128 && cbHeight < 128 ) { | |
|           ciip_flag[ x0 ][ y0 ] | ae(v) |
|           if( ciip_flag[ x0 ][ y0 ] ) { | |
|             if ( cbWidth <= 2 * cbHeight \|\| cbHeight <= 2 * cbWidth ) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ][ y0 ] | ae(v) |
|           } | |
|         } | |
|         if( sps_triangle_enabled_flag && tile_group_type == B && | |
|           ciip_flag[ x0 ][ y0 ] == 0 && cbWidth * cbHeight >= 64 ) | |
|           merge_triangle_flag[ x0 ][ y0 ] | ae(v) |
|         if( merge_triangle_flag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } else if( MaxNumMergeCand >1 ) | |
|           merge_idx[ x0 ][ y0 ] | ae(v) |
|         } | |
|       } | |
|     } | |
|   } | |
| } | |

Technique 4:

In another example of the disclosure, video encoder 200 and video decoder 300 are configured to decouple the signaling of an intra block copy merge candidate index from the regular merge candidate index. This disclosure describes two techniques for decoupling the signaling. The first technique for decoupling is for video encoder 200 and video decoder 300 to use one new context when coding the merge data syntax element merge_idx. The second technique for decoupling is to add one new merge data syntax element defined as ibc_merge_idx.

The proposed syntax change to relative VVC Draft 5 is shown in the table below, where additions are shown between tags <ADD> and </ADD>. Deletions from VVC Draft 5 are shown between tags <DEL> and </DEL>.

TABLE 9-9

Syntax elements and associated binarizations

| | | Binarization | |
|---|---|---|---|
| Syntax structure | Syntax element | Process | Input parameters |
| ... | | | |
| merge_data( ) | mmvd_flag[ ][ ] | FL | cMax = 1 |
| | mmvd_merge_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | ciip_luma_mpm_flag[ ][ ] | FL | cMax = 1 |
| | ciip_luma_mpm_idx[ ][ ] | TR | cMax = 2, cRiceParam = 0 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_flag[ ][ ] | FL | cMax = 1 |
| | merge_triangle_idx[ ][ ] | FL | cMax = 1 |
| | merge_triangle_idx0[ ][ ] | TR | cMax = 4, cRiceParam = 0 |
| | merge_triangle_idx1[ ][ ] | TR | cMax = 3, cRiceParam = 0 |
| | merge_idx[ ][ ] | TR | <DEL> cMax = MaxNumMergeCand − 1, </DEL> <ADD> cMax = (CuPredMode[ x0 ][ y0 ] = = MODE_IBC) ? MaxNumIntraBlockCopyMergeCand − 1 : MaxNumMergeCand − 1, cRiceParam = 0</ADD> |

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| merge_idx[ ][ ] | <DEL> 0</DEL> <ADD> (CuPredMode[ x0 ][ y0 ] = = MODE_IBC) ? 0 : 1</ADD> | bypass | bypass | bypass | bypass | na |

Another embodiment for modification in Table 9-15 is as follows:

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| merge_idx[ ][ ] | <DEL> 0</DEL> <ADD> (CuPredMode[ x0 ][ y0 ] = = MODE_IBC) ? 1 : 2</ADD> | bypass | bypass | bypass | bypass | na |

The proposed syntax change to relative VVC Draft 5 for the second technique for decoupling is shown in the table below, where additions are shown between tags <ADD> and </ADD>. Deletions from VVC Draft 5 are shown between tags <DEL> and </DEL>.

7.3.7.7 Merge Data Syntax

| merge_data( x0, y0, cbWidth, cbHeigh ) { | Descriptor |
|---|---|
| if ( CuPredMode[ x0 ][ y0 ] = = MODE_IBC ) { | |
| if( MaxNumMergeCand > 1 ) | |
| <DEL>merge_idx[ x0 ][ y0 ] </DEL> <ADD> ibc_merge_idx[x0][y0] </ADD> | ae(v) |
| } else { | |
| mmvd_flag[ x0 ][ y0 ] | ae(v) |
| if( mmvd_flag[ x0 ][ y0 ] = = 1 ) { | |
| mmvd_merge_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else { | |
| if( MaxNumSubblockMergeCand > 0 && cbWidth >= 8 && cbHeight >= 8 ) | |
| merge_subblock_flag[ x0 ][ y0 ] | ae(v) |
| if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |
| if( sps_ciip_enabled_flag && cu_skip_flag[ x0 ][ y0 ] = = 0 && ( cbWidth * cbHeight) >= 64 && cbWidth < 128 && cbHeight < 128 ) { | |
| ciip_flag[ x0 ][ y0 ] | ae(v) |
| if( ciip_flag[ x0 ][ y0 ] ) { | |
| if ( cbWidth <= 2 * cbHeight || cbHeight <= 2 * cbWidth ) | |
| ciip_luma_mpm_flag[ x0 ][ y0 ] | ae(v) |
| if( ciip_luma_mpm_flag[ x0 ][ y0 ] ) | |
| ciip_luma_mpm_idx[ x0 ][ y0 ] | ae(v) |
| } | |
| } | |
| if( sps_triangle_enabled_flag && slice_type = = B && ciip_flag[ x0 ][ y0 ] = = 0 && cbWidth * cbHeight >= 64 ) | |
| merge_triangle_flag[ x0 ][ y0 ] | ae(v) |
| if( merge_triangle_flag[ x0 ][ y0 ] ) { | |
| merge_triangle_split_dir[ x0 ][ y0 ] | ae(v) |
| merge_triangle_idx0[ x0 ][ y0 ] | ae(v) |
| merge_triangle_idx1[ x0 ][ y0 ] | ae(v) |
| } else if( MaxNumMergeCand > 1 ) | |
| merge_idx[ x0 ][ y0 ] | ae(v) |
| } | |
| } | |
| } | |
| } | |

7.4.8.7 Merge Data Semantics

<ADD> Ibc_merge_idx[ x0 ][ y0 ] specifies the IBC merging candidate index of the merging candidate list where x0, y0 specify the location ( x0, y0 ) of the top-left luma sample of the considered coding block relative to the top-left luma sample of the picture. </ADD>
When ibc_merge_idx[ x0 ][ y0 ] is not present, it is inferred as 0.

8.6.2.2 Derivation Process for Luma Motion Vector for Merge Mode

This process is only invoked when merge_flag[xCb][yPb] is equal to 1 and CuPredMode[xCb][yPb] is equal to MODE_IBC, where (xCb, yCb) specify the top-left sample of the current luma coding block relative to the top-left luma sample of the current picture.

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vectors in 1/16 fractional-sample accuracy mvL.

The luma motion vector mvL is derived by the following ordered steps:

1. The derivation process for merging candidates from neighbouring coding units as specified in clause 8.6.2.3 is invoked with the luma coding block location (xCb, yCb), the luma coding block width cbWidth, and the luma coding block height cbHeight as inputs, and the outputs being the availability flags availableFlagA0, availableFlagA1, availableFlagB0, availableFlagB1 and availableFlagB2 and the motion vectors mvA0, mvA1, mvB0, mvB1 and mvB2.

2. The merging motion vector candidate list, mergeMvCandList, is constructed as follows:
   i=0
   if(availableFlagA1)
   mergeMvCandList [i++]=mvA1
   if(availableFlagB1)
   mergeMvCandList [i++]=mvB1
   if(availableFlagB0) (8-977)
   mergeMvCandList [i++]=mvB0
   if(availableFlagA0)
   mergeMvCandList [i++]=mvA0
   if(availableFlagB2)
   mergeMvCandList [i++]=mvB2

3. The variable numCurrMergeCand is set equal to the number of merging candidates in the mergeMvCandList.

4. When numCurrMergeCand is less than (MaxNumMergeCand−1) and NumHmvpIbcCand is greater than 0, the derivation process of history-based merging candidates as specified in 8.6.2.5 is invoked with mergeMvCandList, and numCurrMergeCand as inputs, and modified mergeMvCandList and numCurrMergeCand as outputs.

5. When numCurrMergeCand is less than MaxNumMergeCand and greater than 1, the derivation process for pairwise average merging candidate specified in clause 8.6.2.4 is invoked with mergeMvCandList and numCurrMergeCand as inputs, and the outputs are assigned to mergeMvCandList and numCurrMergeCand.

[Ed. (SL): Alert that the merging motion vector candidate list may not be full. In rare case the merge index may point to an empty entry of the merging motion vector candidate array.]

6. The following assignments are made:

mvL[ 0 ] = mergeMvCandList[<DEL> merge_idx </DEL> <ADD> ibc_merge_idx</ADD> [ xCb ][ yCb ]][ 0 ]  (8-978)
mvL[ 1 ] = mergeMvCandList[<DEL> merge_idx </DEL> <ADD> ibc_merge_idx</ADD> [ xCb ][ yCb ]][ 1 ]  (8-979)

TABLE 9-9

| | Syntax elements and associated binarizations | | |
|---|---|---|---|
| Syntax structure | Syntax element | Binarization Process | Input parameters |
| ... | | | |
| merge_data( ) | mmvd_flag[ ][ ] | FL | cMax = 1 |
| | mmvd_merge_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | ciip_luma_mpm_flag[ ][ ] | FL | cMax = 1 |
| | ciip_luma_mpm_idx[ ][ ] | TR | cMax = 2, cRiceParam = 0 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_flag[ ][ ] | FL | cMax = 1 |
| | merge_triangle_idx[ ][ ] | FL | cMax = 1 |
| | merge_triangle_idx0[ ][ ] | TR | cMax = 4, cRiceParam = 0 |
| | merge_triangle_idx1[ ][ ] | TR | cMax = 3, cRiceParam = 0 |
| | merge_idx[ ][ ] | TR | cMax = MaxNumMergeCand − 1, cRiceParam = 0 |
| | <ADD> ibc_merge_idx[ ][ ] | TR | cMax = MaxNumIntraBlockCopyMergeCand − 1, cRiceParam = 0</ADD> |

TABLE 9-15

Assignment of ctxInc to syntax elements with context coded bins

| | binIdx | | | | |
|---|---|---|---|---|---|
| Syntax element | 0 | 1 | 2 | 3 | 4 | >= 5 |
| merge_idx[ ][ ] | 0 | bypass | bypass | bypass | bypass | na |
| <ADD> ibc_merge_idx[ ][ ] | 0 | bypass | bypass | bypass | bypass | na </ADD> |

In another embodiment for modification in Table 9-15, if the number of N in Proposed 1 to Proposed 3 is set 5, then the setting is as follows

| | binIdx | | | | |
|---|---|---|---|---|---|
| Syntax element | 0 1 | 2 | 3 | 4 | >= 5 |
| merge_idx[ ][ ] | 0 bypass | bypass | bypass | bypass | na |
| <ADD> ibc_merge_idx[ ][ ] | 0 bypass | bypass | bypass | na | na</ADD> |

Technique 5:

Full or partial combinations of Technique 1 to Technique 4 can lead to improved processing. One example is to combine Technique 3 using Example 2 and Technique 4 using Example 2

Combined Technique 3 with Example 2 and Technique 4 with Example 2:

| | Descriptor |
|---|---|
| Section 7.3.4.1 tile_group_header ( ) { ... if ( tile_group_type != I ) { if( sps_temporal_mvp_enabled_flag ) | |
|     tile_group_temporal_mvp_enabled_flag | u(1) |
| if( tile_group_type = = B ) | |
|     mvd_l1_zero_flag | u(1) |
| if( tile_group_temporal_mvp_enabled_flag ) { if( tile_group_type = = B ) | |
|     collocated_from_l0_flag | u(1) |
| } if( ( weighted_pred_flag && tile_group_type = = P ) \|\| ( weighted_bipred_flag && tile_group = = B )) pred_weight_table( ) | |
| six_minus_max_num_merge_cand | ue(v) |
| if( sps_affine_enabled_flag ) | |
|     five_minus_max_num_subblock_merge_cand | ue(v) |
| if( sps_fpel_mmvd_enabled_flag ) | |
|     tile_group_fpel_mmvd_enabled_flag | u(1) |
| if ( sps_ibc_enabled_flag && (tile_group_type == I \|\| (tile_group_type != I && MaxNumMergeCand > 1 ) ) ) | |
|     constant_minus_max_num_ibc_merge_cand | ue(v) |
| .. | | constant_minus_max_num_ibc_merge_cand to specify the maximum number of IBC merging candidates supported in the slice subtracted from N, where N is a positive constant, e.g. 6, in the case of tile_group_type equal to I, and N is set as MaxNumMergeCand in the case of tile_group_type not equal to I. The maximum number of IBC merging candidates, -continued

```
MaxNumIntraBlockCopyMergeCand, is derived as follows:
    MaxNumIntraBlockCopyMergeCand = N −
    constant_minus_max_num_ibc_merge_cand,
    The value of MaxNumIntraBlockCopyMergeCand shall be in the range of 1
to N, inclusive, and MaxNumIntraBlockCopyMergeCand is set as 1 if
constant_minus_max_num_ibc_merge_cand is not available.
    Section 7.3.6.8
```

| | Descriptor |
|---|---|
| merge_data( x0, y0, cbWidth, cbHeight ) { | |
|   if( CuPredMode[ x0 ][ y0 ] = = MODE_IBC) { | |
|   if(MaxNumIntraBlockCopyMergeCand > 1) | |
|     ibc_merge_idx[x0][y0] | ae(v) |
|   } else { | |
|     mmvd_flag[ x0 ][ y0 ] | ae(v) |
|     if( mmvd flag[ x0 ][ y0 ] = = 1 ) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >=8 ) | |
|         merge_subblock_flag[ x0 ][ y0 ] | ae(v) |
|       if( merge_subblock_flag[ x0 ][ y0 ] = = 1) { | |
|         if( MaxNumSubblockMergeCand >1 ) | |
|           merge_subblock_idx[ x 0][ y0 ] | ae(v) |
|       } else { | |
|         if( sps_ciip_enabled flag && cu_skip_flag[ x0 ][ y0 ] = = 0 && | |
|           ( cbWidth * cbHeight ) >= 64 && cbWidth < 128 && cbHeight <128 ) { | |
|           ciip_flag[ x0 ][ y0 ] | ae(v) |
|           if( ciip_flag[ x0 ][ y0 ]) { | |
|             if ( cbWidth <= 2 * cbHeight || cbHeight <= 2 * cbWidth ) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ]] y0 ] | ae(v) |
|           } | |
|         } | |
|         if( sps_triangle_enabled_flag && tile_group_type = = B && | |
|           ciip_flag[ x0 ][ y0 ] = = 0 && cbWidth * cbHeight >= 64 ) | |
|           merge_triangle_flag[ x 0][ y0 ] | ae(v) |
|         if( merge_triangle_flag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } else if( MaxNumMergeCand > 1 ) | |
|           merge_idx[ x0 ][ y0 ] | ae(v) |
|       } | |
|     } | |
|   } | |
| } | |

7.4.8.7 Merge Data Semantics

Ibc_merge_idx[ x0 ][ y0 ] specifies the IBC merging candidate index of the merging candidate list where x0, y0 specify the location ( x0, y0 ) of the top-left luma sample of the considered coding block relative to the top-left luma sample of the picture.
When ibc_merge_idx[ x0 ][ y0 ] is not present, it is inferred as 0.

8.6.2.2 Derivation Process for Luma Motion Vector for Merge Mode

This process is only invoked when merge_flag[xCb][yPb] is equal to 1 and CuPredMode[xCb][yPb] is equal to MODE_IBC, where (xCb, yCb) specify the top-left sample of the current luma coding block relative to the top-left luma sample of the current picture.

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvL. The luma motion vector mvL is derived by the following ordered steps:

1. The derivation process for merging candidates from neighbouring coding units as specified in clause 8.6.2.3 is invoked with the luma coding block location (xCb, yCb), the luma coding block width cbWidth, and the luma coding block height cbHeight as inputs, and the outputs being the availability flags availableFlagA0, availableFlagA1, availableFlagB0, availableFlagB1 and availableFlagB2 and the motion vectors mvA0, mvA1, mvB0, mvB1 and mvB2.

2. The merging motion vector candidate list, mergeMvCandList, is constructed as follows:

i=0
if(availableFlagA1)
mergeMvCandList [i++]=mvA1
if(availableFlagB1)
mergeMvCandList [i++]=mvB1
if(availableFlagB0) (8-977)
mergeMvCandList [i++]=mvB0
if(availableFlagA0)
mergeMvCandList [i++]=mvA0
if(availableFlagB2)
mergeMvCandList [i++]=mvB2

3. The variable numCurrMergeCand is set equal to the number of merging candidates in the mergeMvCandList.

4. When numCurrMergeCand is less than (MaxNumMergeCand−1) and NumHmvpIbcCand is greater than 0, the derivation process of history-based merging candidates as specified in 8.6.2.5 is invoked with mergeMvCandList, and numCurrMergeCand as inputs, and modified mergeMvCandList and numCurrMergeCand as outputs.

5. When numCurrMergeCand is less than MaxNumMergeCand and greater than 1, the derivation process for pairwise average merging candidate specified in clause 8.6.2.4 is invoked with mergeMvCandList and numCurrMergeCand as inputs, and the outputs are assigned to mergeMvCandList and numCurrMergeCand.

[Ed. (SL): Alert that the merging motion vector candidate list may not be full. In rare case the merge index may point to an empty entry of the merging motion vector candidate array.]

6. The following assignments are made:
mvL[0]=mergeMvCandList[ibc_merge_idx[xCb][yCb] ][0] (8-978)
mvL[1]=mergeMvCandList[ibc_merge_idx [xCb][yCb] ][1] (8-979)

TABLE 9-15

Assignment of ctxInc to syntax elements with context coded bins

| Syntax element | binIdx | | | | | |
|---|---|---|---|---|---|---|
| | 0 | 1 | 2 | 3 | 4 | >= 5 |
| merge_idx[ ][ ] | 0 | bypass | bypass | bypass | bypass | na |
| ibc_merge_idx[ ][ ] | 0 | bypass | bypass | bypass | bypass | na |

In another example for modification in Table 9-15, if the number of N in Proposed 1 to Proposed 3 is set 5, then the setting is as follows:

| Syntax element | binIdx | | | | | |
|---|---|---|---|---|---|---|
| | 0 | 1 | 2 | 3 | 4 | >= 5 |
| merge_idx[ ][ ] | 0 | bypass | bypass | bypass | bypass | na |
| ibc_merge_idx[ ][ ] | 0 | bypass | bypass | bypass | na | na |

Figure 11:
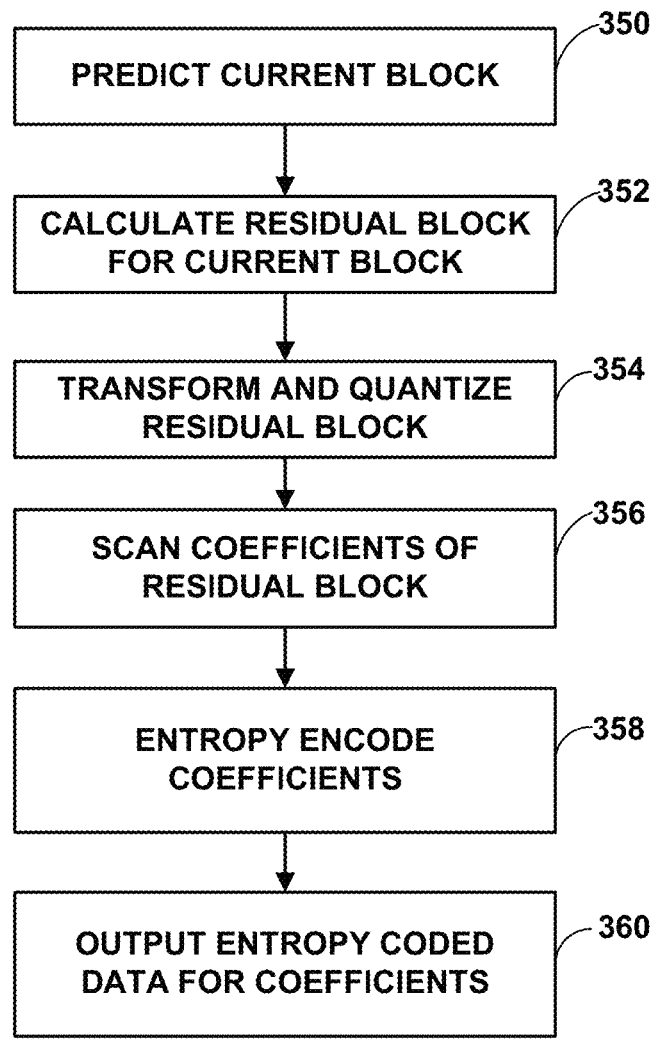
FIG. 11 is a flowchart illustrating an example encoding method.

FIG. 11 is a flowchart illustrating an example method for encoding a current block. The current block may comprise a current CU. Although described with respect to video encoder 200 (FIGS. 1 and 3), it should be understood that other devices may be configured to perform a method similar to that of FIG. 11.

In this example, video encoder 200 initially predicts the current block (350). For example, video encoder 200 may form a prediction block for the current block. For example, IBC unit 227 of video encoder 200 may form a prediction block using the techniques of this disclosure described above and below with reference to FIG. 13. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder

TABLE 9-9

Syntax elements and associated binarizations

| Syntax structure | Syntax element | Binarization | |
|---|---|---|---|
| | | Process | Input parameters |
| ... | | | |
| merge_data( ) | mmvd_flag[ ][ ] | FL | cMax = 1 |
| | mmvd_merge_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | ciipluma_mpm_flag[ ][ ] | FL | cMax = 1 |
| | ciip_luma_mpm_idx[ ][ ] | TR | cMax = 2, cRiceParam = 0 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_flag[ ][ ] | FL | cMax = 1 |
| | merge_triangle_idx[ ][ ] | FL | cMax = 1 |
| | merge_triangle_idx0[ ][ ] | TR | cMax = 4, cRiceParam = 0 |
| | merge_triangle_idx1[ ][ ] | TR | cMax = 3, cRiceParam = 0 |
| | merge_idx[ ][ ] | TR | cMax = MaxNumMergeCand − 1, cRiceParam = 0 |
| | ibc_merge_idx[ ][ ] | TR | cMax = MaxNumIntraBlockCopyMergeCand − 1, cRiceParam = 0 |

200 may entropy encode the coefficients (358). For example, video encoder 200 may encode the coefficients using CABAC. Video encoder 200 may then output the entropy coded data of the block (360).

Figure 12:
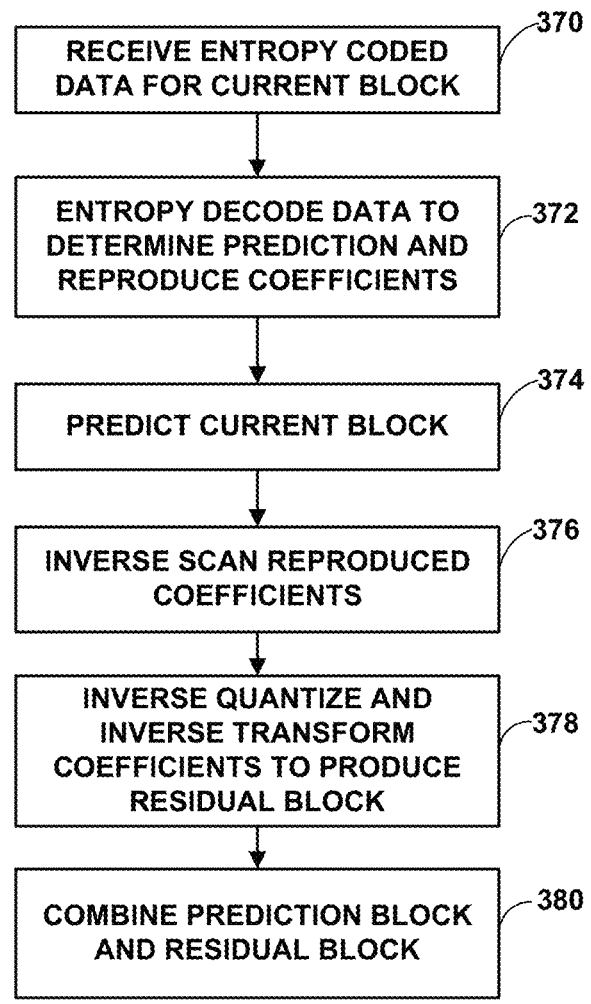
FIG. 12 is a flowchart illustrating an example decoding method.

FIG. 12 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 12.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode, including intra block copy mode, as indicated by the prediction information for the current block, to calculate a prediction block for the current block. For example, IBC unit 317 of video decoder 300 may form a prediction block using the techniques of this disclosure described above and below with reference to FIG. 13. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 13:
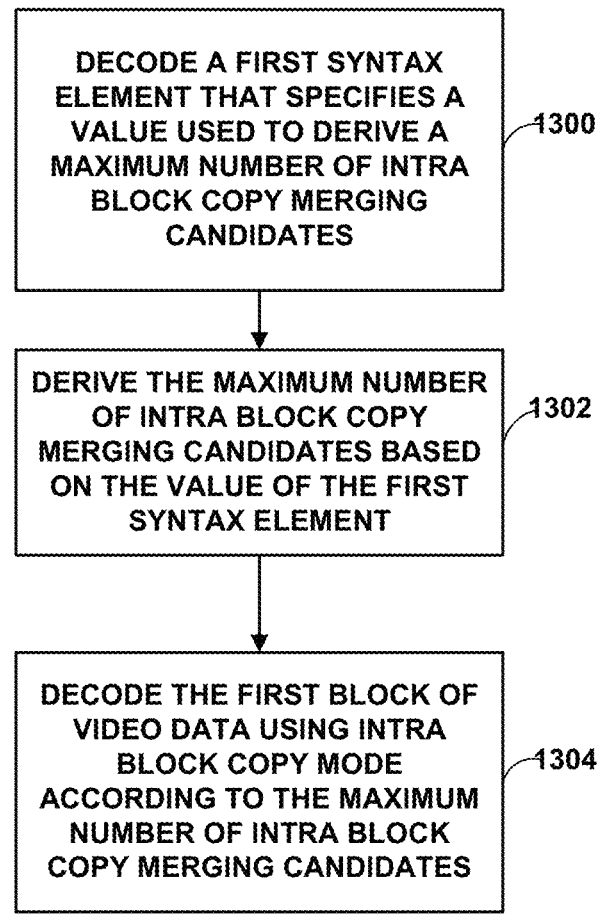
FIG. 13 is a flowchart illustrating an example decoding method according to the techniques of this disclosure.

FIG. 13 is a flowchart illustrating an example decoding method according to the techniques of this disclosure. Structural components video decoder 300 (FIG. 4) may be configured to perform the techniques of FIG. 13, including IBC unit 317.

In one example, video decoder 300 may be configured to decode a first syntax element that specifies a value used to derive a maximum number of intra block copy merging candidates (1300), derive the maximum number of intra block copy merging candidates based on the value of the first sytnax element (1302), and decode the first block of video data using intra block copy mode according to the maximum number of intra block copy merging candidates (1304).

Figure 14:
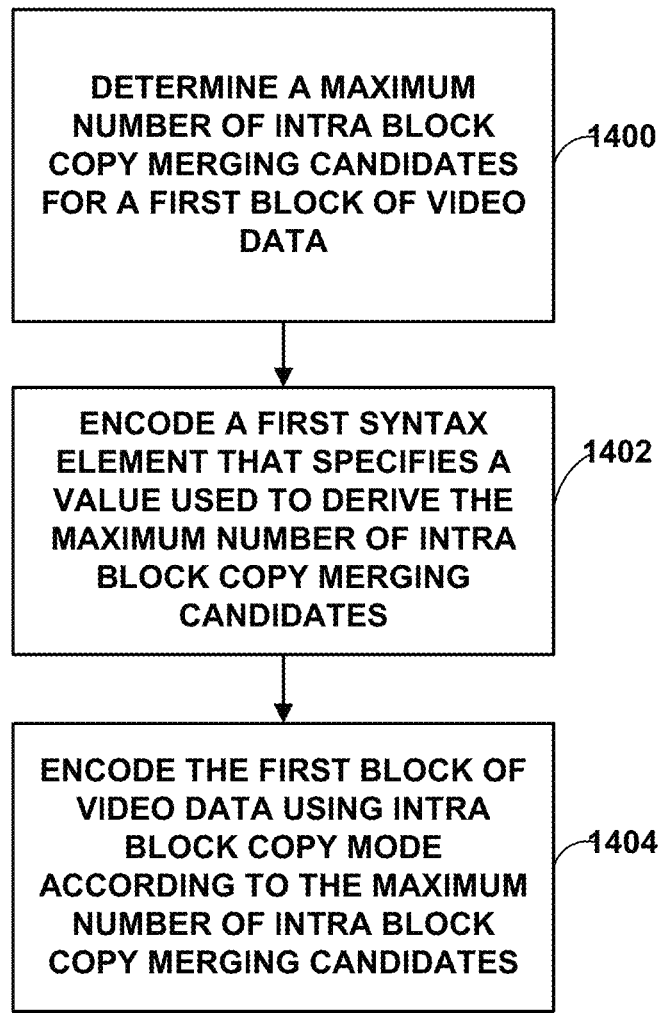
FIG. 14 is a flowchart illustrating an example encoding method according to the techniques of this disclosure.

FIG. 14 is a flowchart illustrating an example encoding method according to the techniques of this disclosure. Structural components of video encoder 200 (FIG. 3) may be configured to perform the techniques of FIG. 13, including IBC unit 227.

In one example, video decoder 300 may be configured to determine a maximum number of intra block copy merging candidates for a first block of video data (1400), encode a first syntax element that specifies a value used to derive the maximum number of intra block copy merging candidates (1402), and encode the first block of video data using intra block copy mode according to the maximum number of intra block copy merging candidates (1404).

Other illustrative examples of the disclosure are described below.

Example 1

A method of coding video data, the method comprising: coding a slice-level syntax element (constant_minus_max_num_ibc_merge_cand) that specifies the maximum number of intra block copy merging candidates; and coding a block of video data in a slice according to the slice-level syntax element.

Example 1

The method of Example 1, further comprising: determining the maximum number of intra block merging candidates based on a tile group type.

Example 1

The method of Example 1, wherein an upper bound for the number of intra block copy merging candidates is the maximum number of merge candidates (MaxNumMergeCand) for a tile group type that is not equal to I.

Example 1

The method of Example 1, further comprising: coding a merge candidate index separately from coding an intra block copy merge candidate index.

Example 1

The method of any Examples 1-4, wherein the syntax element that specifies the maximum number of intra block copy merging candidates is different than a syntax element that specifies a maximum number of regular merge candidates.

Example 1

The method of any of Examples 1-5, wherein coding comprises decoding.

Example 1

The method of any of Examples 1-5, wherein coding comprises encoding.

Example 1

A device for coding video data, the device comprising one or more means for performing the method of any of Examples 1-7.

Example 1

The device of Example 8, wherein the one or more means comprise one or more processors implemented in circuitry.

Example 1

The device of any of Examples 8 and 9, further comprising a memory to store the video data.

Example 1

The device of any of Examples 8-10, further comprising a display configured to display decoded video data.

Example 1

The device of any of Examples 8-11, wherein the device comprises one or more of a camera, a computer, a mobile device, a broadcast receiver device, or a set-top box.

Example 1

The device of any of Examples 8-12, wherein the device comprises a video decoder.

Example 1

The device of any of Examples 8-12, wherein the device comprises a video encoder.

Example 1

A computer-readable storage medium having stored thereon instructions that, when executed, cause one or more processors to perform the method of any of Examples 1-7.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding a first syntax element that specifies a value used to derive a maximum number of intra block copy merging candidates for an intra block copy mode;
   deriving the maximum number of intra block copy merging candidates based on the value of the first syntax element;
   constructing an intra block copy merging candidate list for a first block of video data based on the maximum number of intra block copy merging candidates;
   determining a binarization parameter (cMax) for a merge index based on a prediction mode for the first block being the intra block copy mode and the maximum number of intra block copy merging candidates;
   decoding, based on the maximum number of intra block copy merging candidates being greater than one and using the binarization parameter, the merge index of the intra block copy merging candidate list;
   determining, based on the merge index, an intra block copy merging candidate within the intra block copy merging candidate list; and
   decoding the first block of video data using the intra block copy mode and the intra block copy merging candidate.

2. The method of claim 1, further comprising:
   decoding an intra block copy enabled flag; and
   decoding the first syntax element that specifies the value used to derive the maximum number of intra block copy merging candidates based on the intra block copy enabled flag indicating that intra block copy mode is enabled for the first block of video data.

3. The method of claim 1, wherein determining the binarization parameter for the merge index based on the prediction mode for the first block being the intra blcok copy mode and the maximum number of intra block copy merging candidates comprises:

determining the binarization parameter cMax based on the following equation: cMax=(CuPredMode[x0][y0]==MODE_IBC) ? MaxNumIntraBlockCopyMergeCand−1: MaxNumMergeCand−1, wherein CuPredMode is the prediction mode variable, MODE_IBC is the intra block copy mode, MaxNumIntraBlockCopyMergeCand is the maximum number of intra block copy merging candidates, and MaxNumMergeCand is a maximum number of inter-prediction merging candidates.

4. The method of claim 1, wherein decoding the first block of video data using the intra block copy mode and the intra block copy merging candidate comprises:
   determining a block vector associated with the intra block copy merging candidate; and
   decoding the first block of video data using the determined block vector.

5. The method of claim 1, wherein the maximum number of intra block copy merging candidates ranges from 1 to 6.

6. The method of claim 1, wherein deriving the maximum number of intra block copy merging candidates based on the value of the first syntax element comprises:
   subtracting the value of the first syntax element from 6 to derive the maximum number of intra block copy merging candidates.

7. The method of claim 1, wherein the first syntax element that specifies the value used to derive the maximum number of intra block copy merging candidates is different than a second syntax element that specifies a value used to derive a maximum number of inter-prediction merging candidates.

8. The method of claim 7, further comprising:
   decoding the second syntax element that specifies the value used to derive the maximum number of inter-prediction merging candidates; and
   decoding a second block of video data using inter-prediction merge mode according to the maximum number of inter-prediction merging candidates specified by the second syntax element.

9. The method of claim 1, further comprising:
   displaying a picture that includes the first block of video data.

10. An apparatus configured to decode video data, the apparatus comprising:
    a memory configured to store a first block of video data; and
    one or more processors, implemented in circuitry and in communication with the memory, the one or more processors configured to:
      decode a first syntax element that specifies a value used to derive a maximum number of intra block copy merging candidates for an intra block copy mode;
      derive the maximum number of intra block copy merging candidates based on the value of the first syntax element;
      construct an intra block copy merging candidate list for the first block of video data based on the maximum number of intra block copy merging candidates;
      determine a binarization parameter (cMax) for a merge index based on a prediction mode for the first block being the intra block copy mode and the maximum number of intra block copy merging candidates;
      decode, based on the maximum number of intra block copy merging candidates being greater than one and using the binarization parameter, the merge index of the intra block copy merging candidate list;
      determine, based on the merge index, an intra block copy merging candidate within the intra block copy merging candidate list; and
      decode the first block of video data using the intra block copy mode and the intra block copy merging candidate.

11. The apparatus of claim 10, wherein the one or more processors are further configured to:
    decode an intra block copy enabled flag; and
    decode the first syntax element that specifies the value used to derive the maximum number of intra block copy merging candidates based on the intra block copy enabled flag indicating that intra block copy mode is enabled for the first block of video data.

12. The apparatus of claim 10, wherein to determine the binarization parameter for the merge index based on the prediction mode for the first block being the intra block copy mode and the maximum number of intra block copy merging candidates, the one or more processors are further configured to:
    determine the binarization parameter cMax based on the following equation: cMax=(CuPredMode[x0][y0]==MODE_IBC) ? MaxNumIntraBlockCopyMergeCand−1: MaxNumMergeCand−1, wherein CuPredMode is a prediction mode variable, MODE_IBC is the intra block copy mode, MaxNumIntraBlockCopyMergeCand is the maximum number of intra block copy merging candidates, and MaxNumMergeCand is a maximum number of inter-prediction merging candidates.

13. The apparatus of claim 10, wherein to decode the first block of video data using the intra block copy mode and the intra block copy merging candidate, the one or more processors are further configured to:
    determine a block vector associated with the intra block copy merging candidate; and
    decode the first block of video data using the determined block vector.

14. The apparatus of claim 10, wherein the maximum number of intra block copy merging candidates ranges from 1 to 6.

15. The apparatus of claim 10, wherein to derive the maximum number of intra block copy merging candidates based on the value of the first syntax element, the one or more processors are further configured to:
    subtract the value of the first syntax element from 6 to derive the maximum number of intra block copy merging candidates.

16. The apparatus of claim 10, wherein the first syntax element that specifies the value used to derive the maximum number of intra block copy merging candidates is different than a second syntax element that specifies a value used to derive a maximum number of inter-prediction merging candidates.

17. The apparatus of claim 16, wherein the one or more processors are further configured to:
    decode the second syntax element that specifies the value used to derive the maximum number of inter-prediction merging candidates; and
    decode a second block of video data using inter-prediction merge mode according to the maximum number of inter-prediction merging candidates specified by the second syntax element.

18. The apparatus of claim 10, further comprising:
    a display configured to display a picture that includes the first block of video data.

19. An apparatus configured to code video data, the apparatus comprising:
means for coding a first syntax element that specifies a value used to derive a maximum number of intra block copy merging candidates for an intra block copy mode;
means for deriving the maximum number of intra block copy merging candidates based on the value of the first syntax element;
means for constructing an intra block copy merging candidate list for a first block of video data based on the maximum number of intra block copy merging candidates;
means for determining a binarization parameter (cMax) for a merge index based on a prediction mode for the first block being the intra block copy mode and the maximum number of intra block copy merging candidates;
means for coding, based on the maximum number of intra block copy merging candidates being greater than one and using the binarization parameter, the merge index of the intra block copy merging candidate list;
means for determining, based on the merge index, an intra block copy merging candidate within the intra block copy merging candidate list; and
means for coding the first block of video data using the intra block copy mode and the intra block copy merging candidate.

20. A non-transitory computer-readable storage medium storing instructions that, when executed, cause one or more processors of a device configured to code video data to:
code a first syntax element that specifies a value used to derive a maximum number of intra block copy merging candidates for an intra block copy mode;
derive the maximum number of intra block copy merging candidates based on the value of the first syntax element;
construct an intra block copy merging candidate list for a first block of video data based on the maximum number of intra block copy merging candidates;
determine a binarization parameter (cMax) for a merge index based on a prediction mode for the first block being the intra block copy mode and the maximum number of intra block copy merging candidates;
decode, based on the maximum number of intra block copy merging candidates being greater than one and using the binarization parameter, the merge index of the intra block copy merging candidate list;
determine, based on the merge index, an intra block copy merging candidate within the intra block coopy merging candidate list; and
code the first block of video data using the intra block copy mode and the intra block copy merging candidate.

21. An apparatus configured to encode video data, the apparatus comprising:
a memory configured to store a first block of video data; and
one or more processors, implemented in circuitry and in communication with the memory, the one or more processors configured to:
determine a maximum number of intra block copy merging candidates for a first block of video data;
encode a first syntax element that specifies a value used to derive the maximum number of intra block copy merging candidates;
construct an intra block copy merging candidate list for the first block of video data based on the maximum number of intra block copy merging candidates;
determine an intra block copy merging candidate within the intra block copy merging candidate list;
determine a merge index for the intra block copy merging candidate;
determine a binarization parameter (cMax) for the merge index based on a prediction mode for the first block being the intra block copy mode and the maximum number of intra block copy merging candidates;
encode, based on the maximum number of intra block copy merging candidates being greater than one and using the binarization parameter, the merge index of the intra block copy merging candidate list; and
encode the first block of video data using the intra block copy mode and the intra block copy merging candidate.

22. The apparatus of claim 21, wherein the one or more processors are further configured to:
encode an intra block copy enabled flag; and
encode the first syntax element that specifies the value used to derive the maximum number of intra block copy merging candidates based on the intra block copy enabled flag indicating that intra block copy mode is enabled for the first block of video data.

23. The apparatus of claim 21, wherein to determine the binarization parameter for the merge index based on the prediction mode for the first block being the intra block copy mode and the maximum number of intra block copy merging candidates, the one or more processors are further configured to:
determine the binarization parameter cMax based on the following equation: cMax=(CuPredMode[x0][y0]==MODE_IBC) ? MaxNumIntraBlockCopyMergeCand−1: MaxNumMergeCand−1, wherein CuPredMode is a prediction mode variable, MODE_IBC is the intra block copy mode, MaxNumIntraBlockCopyMergeCand is the maximum number of intra block copy merging candidates, and MaxNumMergeCand is a maximum number of inter-prediction merging candidates.

24. The apparatus of claim 21, wherein to encode the first block of video data using intra block copy mode and the intra block copy merging candidate, the one or more processors are further configured to:
determine a block vector associated with the intra block copy merging candidate; and
encode the first block of video data using the determined block vector.

25. The apparatus of claim 21, wherein the maximum number of intra block copy merging candidates ranges from 1 to 6.

26. The apparatus of claim 21, wherein the first syntax element that specifies the value used to derive the maximum number of intra block copy merging candidates is different than a second syntax element that specifies a value used to derive a maximum number of inter-prediction merging candidates.

27. The apparatus of claim 26, wherein the one or more processors are further configured to:
encode the second syntax element that specifies the value used to derive the maximum number of inter-prediction merging candidates; and
encode a second block of video data using inter-prediction merge mode according to the maximum number of inter-prediction merging candidates.

28. The apparatus of claim 21, further comprising:
a camera configured to capture a picture that includes the first block of video data.

\* \* \* \* \*